United States Patent
Cruz et al.

(10) Patent No.: US 9,564,277 B2
(45) Date of Patent: Feb. 7, 2017

(54) SYSTEMS AND DEVICES FOR REDUCING PHANTOM LOAD

(71) Applicant: International Electrical Savings & Development, LLC, El Cajon, CA (US)

(72) Inventors: Paul M. Cruz, San Diego, CA (US); Thomas J. McKenzie, Ramona, CA (US); Daniel B. Brunning, Oceanside, CA (US)

(73) Assignee: International Electrical Saving & Development, LLC, El Cajon, CA (US)

( * ) Notice: Subject to any disclaimer, the term of this patent is extended or adjusted under 35 U.S.C. 154(b) by 337 days.

(21) Appl. No.: 14/186,304

(22) Filed: Feb. 21, 2014

(65) Prior Publication Data

US 2014/0246926 A1 Sep. 4, 2014

Related U.S. Application Data

(63) Continuation of application No. 12/958,369, filed on Dec. 1, 2010, now Pat. No. 8,664,804.

(60) Provisional application No. 61/317,617, filed on Mar. 25, 2010, provisional application No. 61/265,688, filed on Dec. 1, 2009.

(51) Int. Cl.
*H01H 9/54* (2006.01)
*H02J 9/00* (2006.01)
*H01H 47/00* (2006.01)

(52) U.S. Cl.
CPC .......... *H01H 9/54* (2013.01); *H02J 9/005* (2013.01); *H01H 47/007* (2013.01); *H02J 2009/007* (2013.01); *Y10T 307/858* (2015.04); *Y10T 307/865* (2015.04); *Y10T 307/872* (2015.04)

(58) Field of Classification Search
CPC ... H02J 9/005; H02J 2009/007; H01H 47/007; H01H 9/54; Y10T 307/858; Y10T 307/865; Y10T 307/872
USPC ........................................................ 307/131
See application file for complete search history.

(56) References Cited

U.S. PATENT DOCUMENTS

| | | |
|---|---|---|
| 4,190,800 A | 2/1980 | Kelly, Jr. et al. |
| 4,281,515 A | 8/1981 | Ferriera |
| 4,565,929 A | 1/1986 | Baskin et al. |
| 4,626,763 A | 12/1986 | Edwards |
| 5,539,601 A | 7/1996 | Farag |
| 6,434,024 B2 | 8/2002 | Shirato |

(Continued)

FOREIGN PATENT DOCUMENTS

| EP | 1 819 027 A2 | 8/2007 |
|---|---|---|
| WO | WO 2008/064410 A1 | 6/2008 |

OTHER PUBLICATIONS

Office Action dated Jul. 31, 2014 for Australian Patent Application No. 2010326045 filed Jun. 29, 2012.

(Continued)

*Primary Examiner* — Rexford Barnie
*Assistant Examiner* — Toan Vu
(74) *Attorney, Agent, or Firm* — Knobbe, Martens, Olson & Bear LLP

(57) ABSTRACT

Systems and devices are described herein for reducing a phantom load. The system may include a device for connection to a power source and a transformer or machine, wherein the device is configured to disconnect the transformer or machine from the power source under a predetermined load condition. The device may include a contactor, a current detector, a timer, and a controller. Portions of the current detector, timer, or controller may be implemented in a microcontroller.

18 Claims, 15 Drawing Sheets

(56) References Cited

U.S. PATENT DOCUMENTS

| | | |
|---|---|---|
| 7,646,275 B2 | 1/2010 | West |
| 7,928,675 B2 | 4/2011 | Chen |
| 8,058,958 B2 | 11/2011 | West |
| 2003/0080624 A1 | 5/2003 | Belson et al. |
| 2004/0246085 A1 | 12/2004 | West |
| 2010/0109431 A1 | 5/2010 | West |
| 2012/0019963 A1 | 1/2012 | West |

OTHER PUBLICATIONS

Frequently Asked Questions. Retrieved Oct. 1, 2010, from http://www.nomorestandby.com/faq.htm.
How the Standby Plug Works. Retrieved Oct. 1, 2010, from http://www.nomorestandby.com/how.htm.
International Search Report and Written Opinion of the International Searching Authority for PCT/US2010/068520 mailed Jul. 28, 2011.
Written Opinion of the International Preliminary Examination Authority for PCT/US2010/068520 mailed Dec. 8, 2011.

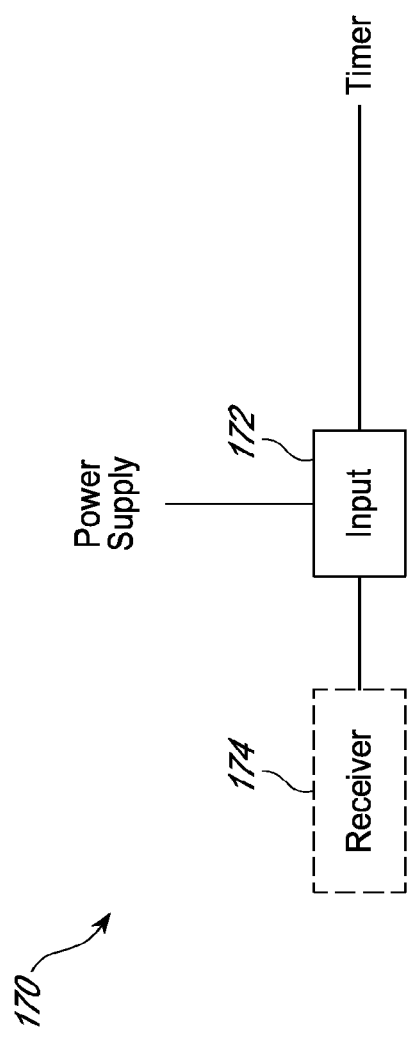
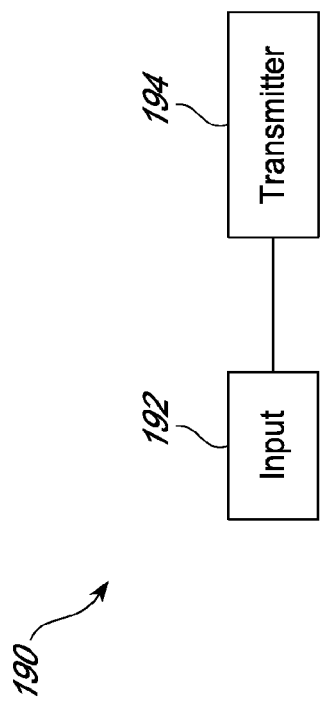
FIG. 6
FIG. 7

SYSTEMS AND DEVICES FOR REDUCING PHANTOM LOAD

RELATED APPLICATIONS

This application is a continuation of U.S. patent application Ser. No. 12/958,369, filed on Dec. 1, 2010. U.S. patent application Ser. No. 12/958,369 claims the benefit of U.S. Provisional Application No. 61/265,688, filed Dec. 1, 2009, and claims the benefit of U.S. Provisional Application No. 61/317,617, filed Mar. 25, 2010. Each of these applications is hereby expressly incorporated herein by reference in its entirety.

BACKGROUND

Field of the Invention

The present invention relates generally to systems and devices for reducing phantom current drawn by a transformer or other machine or device.

Description of the Related Art

Many industrial and household products remain plugged in or otherwise attached to a power source even when arranged in an off configuration or a powered down configuration. In addition, some machine environments include a transformer that is substantially continually or persistently connected to a power source, for example in an industrial setting where the transformer is in communication with one or more machines. Such products, transformers, and/or machines may draw a phantom current, thereby increasing the costs of operation and wasting energy.

SUMMARY

Systems, methods, and/or devices described herein may each have one or several aspects, each of which may have desirable attributes. Without limiting the scope of any aspect or embodiment, several features will now be discussed briefly. After considering this discussion, and particularly after reading the section entitled "Detailed Description of Certain Embodiments," one will understand how features described herein may reduce a phantom load and/or current.

One embodiment includes a system for reducing phantom load in a device. The device may receive three or more phases of alternating current from an electrical power source. The system includes outputs configured to provide electric power obtained at least in part from the three or more phases of alternating current. The system further includes a contactor configured for electrical connection to each phase of the alternating current and for electrical connection to inputs of the device. The contactor may be configured to selectively connect each of the phases to a respective input of the device, and the outputs may be in electrical communication with the contactor. The system further includes a current detector configured for electrical communication with the outputs. The comprises at least of a plurality of current sensors associated with each of the phases provided by the outputs, a summer configured to sum the current sensed in each of the current sensors, and a comparator configured to compare the summed current to a predetermined value. The comparator is configured to generate a first signal when the summed current is less than the predetermined value. The system further includes a timer in communication with the comparator and configured to indicate that a predetermined amount of time has elapsed, and a controller configured to receive the first signal from the comparator and the indication from the timer. The controller may be further configured to cause the contactor to disconnect each phase of alternating current of the power source from the inputs of the device based on at least the first signal and the indication.

Another embodiment includes an apparatus for automatically disconnecting a device from a power source. The power source may provide two or more phases of current. The apparatus includes two or more outputs and a switch electrically configured for electrical connection to the power source and to inputs of the device. Each of the outputs may correspond to a respective phase of the two or more phases of current. The switch may be configured to selectively connect the two or more phases of current to the inputs of the device. The apparatus further includes at least two current sensors configured to sense current flowing to the outputs, a comparator configured to detect when the total current sensed in the at least two current sensors is below a threshold, and a determination unit in communication with the switch. The determination unit may be configured to determine, based at least on the detection of the comparator, when to disconnect the two or more phases of current from the inputs of the device.

Still another embodiment includes a device including means for sensing total current drawn by an apparatus from a power source, means for indicating that a selected amount of time has expired, means for determining when the total current drawn by the apparatus is less than a threshold and the selected amount of time has expired, and means for electrically disconnecting the power source from the device based at least in part on the determination of the determining means. The means for determining may include means for detecting when the total current is below the threshold.

Yet another embodiment includes a method of reducing a phantom load. The method includes coupling a power source to an input of an apparatus, coupling a device to an output of the apparatus, and attaching a current sensor around a conductor of the output. The apparatus may comprise a switch coupled to the input, a comparator configured to detect when current sensed in the current sensor is below a threshold, and a determination unit in communication with the switch. The switch may be configured to selectively connect the input to the output. The determination unit may be configured to determine, based at least on the detection of the comparator, when to disconnect the input from the output. The method further includes adjusting a parameter of the determination unit such that current drawn by the device when the device is active is above the threshold, and such that current drawn by the device when the device is idle is below the threshold.

BRIEF DESCRIPTION OF THE DRAWINGS

The above mentioned and other features will now be described with reference to the drawings of several embodiments of the systems, methods, and devices for reducing phantom load. The illustrated embodiments are intended to illustrate, but not to limit any of the embodiments or aspects. The drawings contain the following figures:

FIG. 6 is a functional block diagram of an embodiment of an enable unit for use in the system of FIG. 1A or FIG. 1B.

FIG. 7 is a functional block diagram of an embodiment of a remote enable unit for use in the system of FIG. 1A or FIG. 1B.

DETAILED DESCRIPTION OF CERTAIN EMBODIMENTS

The following description and examples illustrate embodiments of the systems and devices for reducing phantom load. Embodiments described herein relate to a phantom current saver, for example for use with heavy or industrial machinery. Phantom current may refer to current that is drawn from a power, voltage, or electricity source when a device or machine connected to that source is off. Those of skill in the art will understand that the term phantom load may also be used, for example to indicate a power drawn by a device or machine from a source when the machine is off, and that embodiments described herein similarly relate to a phantom load saver.

Embodiments described herein may save the energy dissipated in a transformer used to power heavy or industrial machinery when the machinery is not in use. For example, when a machine switch is OFF, the primary of a transformer coupled to that machine may still draw a substantial phantom current. In some embodiments, a device as described herein may substantially reduce the phantom current drawn by the transformer by disconnecting the transformer from a power source when the machine is not in use. In some configurations, a machine itself may draw a phantom current when OFF. In some embodiments, a device as described herein may disconnect the machine from a power source so as to substantially reduce the phantom current drawn by the machine when OFF.

Embodiments described herein may also or in the alternative save the energy consumed by a machine or apparatus when in an idle or standby state. For example, when the machine is not being actively used but is still ON, the machine may still consume power. In some embodiments, a device as described herein may substantially reduce the power consumed by such machine when idle by disconnecting the machine from a transformer or power source when the machine is not in use, for example when a current drawn by the machine drops below a threshold.

One skilled in the art may also find additional applications for the devices, systems, and/or methods disclosed herein. Accordingly, the illustration and description of the devices, systems, and/or methods herein are merely exemplary of possible applications.

Figure 1A:
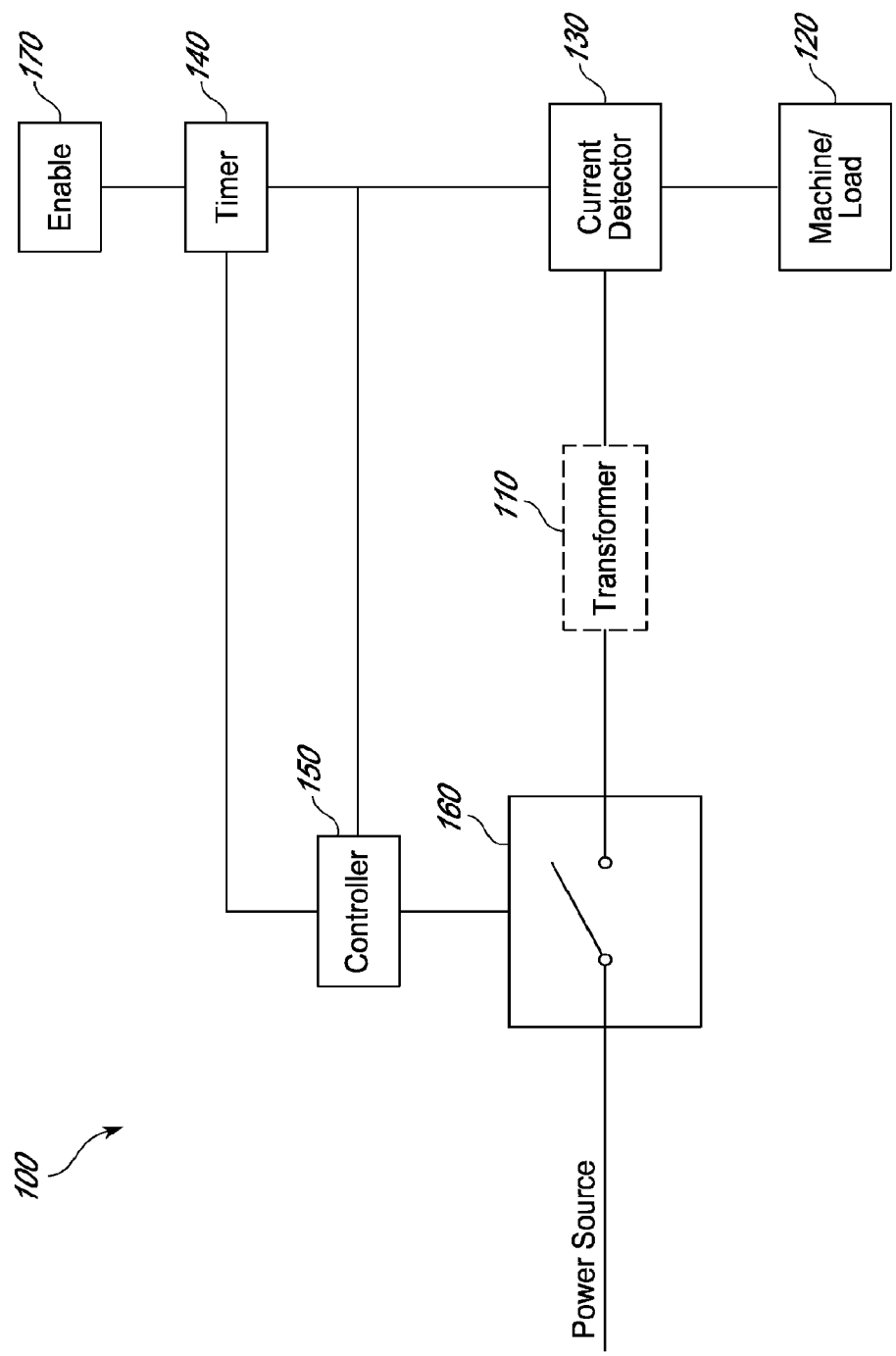
FIG. 1A is a functional block diagram of an embodiment of a system for reducing phantom load.

FIG. 1A illustrates a functional block diagram of an embodiment of a system 100 for reducing phantom load. The system 100 may comprise a transformer 110 configured to provide current from a power source to a machine or other load 120. The transformer is configured to scale each of one or more phases of current from the power source by amplifying or reducing the voltage of each phase. The transformer 110 is further configured to output each scaled phase at respective outputs of the transformer 110. In some embodiments, the current is alternating current, for example as received from a power grid. In some embodiments, there may be two, three, four, or more phases of current received from the power source. The machine 120 may comprise any machine or device configured to draw a current from the output of the transformer 110. The system 100 may reduce energy dissipated in the transformer 110, for example, when the machine 120 is not in use.

In some embodiments, the transformer 110 is omitted from the system 100. In such embodiments, the machine 120 draws current directly from the power source. For example, in a factory or other industrial setting, the machine 120 may be plugged into or wired to 480VAC three phase from a utility. In such configuration, the system 100 may reduce power consumed by the machine 120 when the machine 120 is in a standby or idle state, for example.

The system 100 further comprises a current detector 130 configured to detect the total current drawn by the machine 120 from the transformer 110 or the power source. The current detector 120 is coupled to a timer 140 and/or a controller 150, and may be configured to detect when the total current drawn by the machine 120 is below a predetermined threshold. In some embodiments, when the total detected current is below the predetermined threshold, the current detector 130 may output a first signal to the timer 140 and the controller 150. The current detector 130 may be further configured to output a second signal to the timer 140 and the controller 150 when the total detected current is greater than the predetermined threshold.

The timer 140 is configured to determine when a predetermined amount of time has elapsed. In some embodiments, the timer 140 is configured to receive the first signal from the current detector 130 and generate a third signal indicating that the predetermined amount of time has elapsed since receiving the first signal. In other embodiments, the timer 140 is configured to generate the third signal in response to receiving the first signal if the predetermined amount of time has elapsed since the system 100 was activated, turned on, or otherwise enabled, for example by an enable unit 170. In some embodiments, the timer 140 is configured to allow a user to select the predetermined amount of time. In some embodiments, the timer 140 comprises a binary coded decimal switch configured to allow a user to adjust the selected amount of time.

The controller 150 is configured to cause a switch 160 to disconnect the machine 120 from the power source. In embodiments including the transformer 110, the switch 160 may be disposed between the power source and the transformer 110, for example as illustrated in FIG. 1A. In such embodiments, the current detector 130 may be disposed between the transformed 110 and the machine 120. In embodiments omitting the transformer 110, the current detector 130 may be disposed between the power source and the switch 160 in some aspects, and between the switch 160 and the machine 120 in other aspects.

In some embodiments, each phase of power source current is disconnected from the machine 120 based on one or more of the first, second, and third signals. In one embodiment, the controller 150 causes the switch 160 to disconnect the transformer 110 and/or the machine 120 from the power source when the third signal indicates that the predetermined amount of time has elapsed if the total detected current has remained below the predetermined threshold during the entire predetermined amount of time. In some embodiments, the timer 140 will stop a countdown started after receiving the first signal if the second signal is received before expiration of the predetermined amount of time. In some embodiments, the timer will restart the countdown if the first signal is received again after the second signal is received. In this way, the timer 140 may be configured to provide the third signal only when the total detected current has remained below the predetermined threshold during the entire predetermined amount of time. In embodiments where the timer 140 generates the third signal in response to receiving the first signal when the predetermined amount of time has elapsed since the system 100 was enabled, the controller 150 causes the switch 160 to disconnect the transformer 110 and/or the machine 120 from the power source substantially immediately or after a negligible delay.

In some embodiments, the timer 140 and at least a portion of the controller 150 may implemented as a single device, unit, or circuit. For example, in some embodiments, a processor or microcontroller performs the functions of the both the timer 140 and a portion of the controller 150. In other embodiments, the timer 140 and the controller 150 are configured as separate device, for example as separate circuits that are coupled together.

The system 100 may further comprise an enable unit 170 in communication with an input device. The enable unit 170 is configured to notify the controller 150 of a user input on the input device. The controller 150 may be further configured to cause the switch 160 to connect each phase of current from the power source to the inputs of the transformer 110 and/or the machine 120 in response to being notified. In the illustrated embodiment, the enable unit 170 is in electrical contact with the timer 140. In such embodiment, the enable unit 170 notifies the controller 150 of the user input via the timer 140. In other embodiments, the enable unit 170 notifies the controller 150 of the user input directly. Thus, the enable unit 170 may be coupled directly to the controller 150 (not shown). In some embodiments, activation of the enable unit 170 starts or initiates the timer 140 in addition to notifying the controller 150.

Figure 1B:
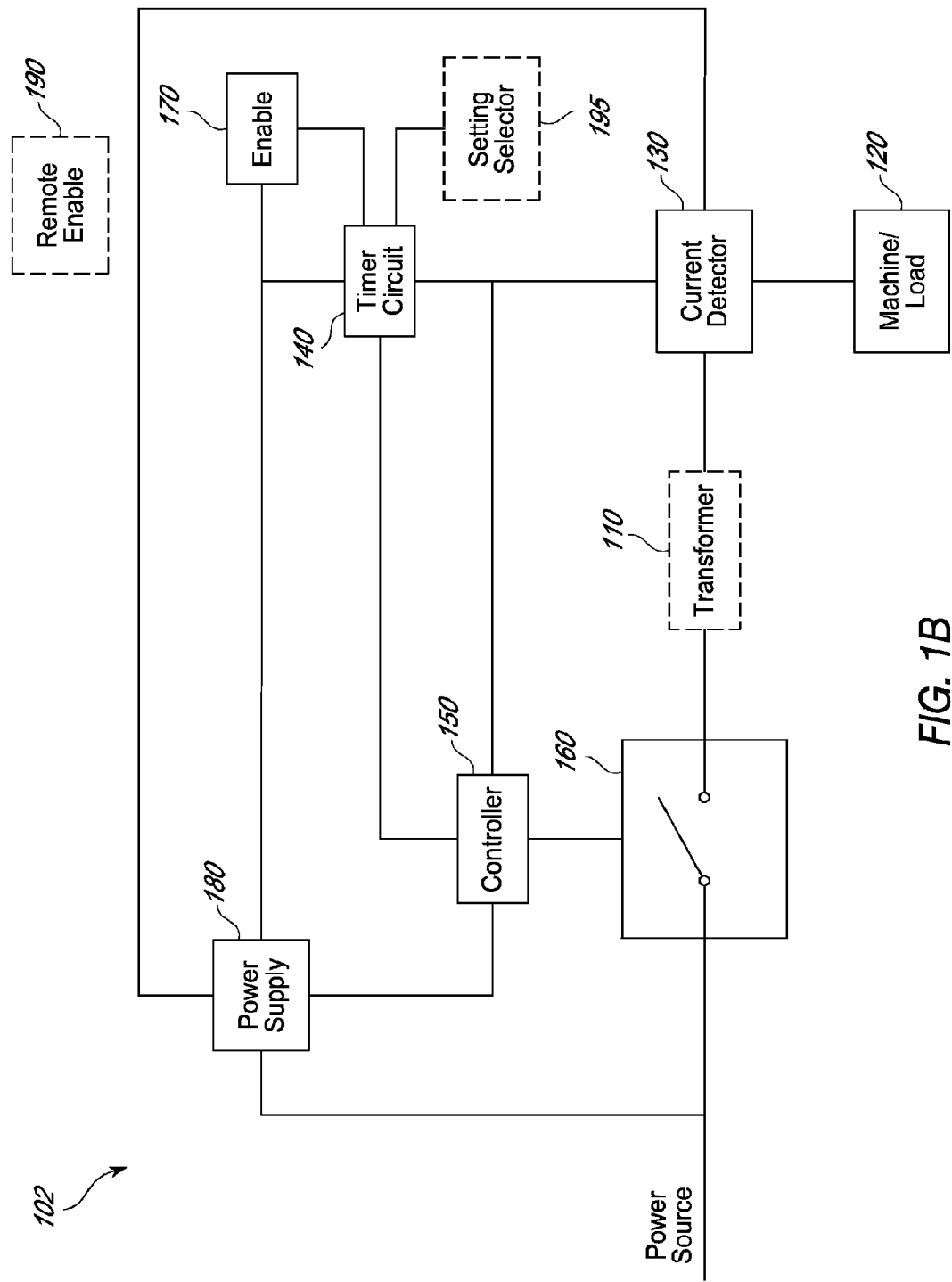
FIG. 1B is a functional block diagram of an embodiment of a system for reducing phantom load.

FIG. 1B illustrates a functional block diagram of an embodiment of a system 102 for reducing phantom load. The system 102 comprises the machine 120, current detector 130, timer 140, controller 150, switch 160, and enable unit 170 described above with respect to the system 100, and may comprise the transformer 110 as described above.

The system 102 is illustrated as further comprising a power supply 180. In the illustrated embodiment, the power supply 180 is configured to transform at least one phase of alternating current from the power source into a direct current voltage. This direct current voltage may be provided to one or more of the current detector 130, timer 140, controller 150, and enable unit 170, for example to power one or more of these elements. In some embodiments, the power supply 180 is configured to transform one or more phases of the alternating current into a plurality of direct current voltages. In some embodiments, the power supply 180 comprises one or more batteries that provide DC voltage. In some embodiments, the power supply 180 is a separate or external DC voltage source that is input into the system 102.

In some embodiments, the system 102 further comprises means for suppressing transients (not shown) received from the power source and/or generated by the switch 160 when switching between closed and open states. For example, the suppression means may suppress high voltage transients generated within a coil in the switch 160. An embodiment of a switch having a coil is described in additional detail below. Suppression of transients not only may protect certain elements of the system 102 from damage, but suppression of transients may also reduce the likelihood that a spike would be interpreted by the current detector 130 as an indication that the machine 120 had been activated again and was drawing a current above the predetermined threshold. Although the means for suppressing transients is not shown in FIG. 1B, an embodiment of such means is illustrated as element 1150 in FIG. 11, described in additional detail below.

The suppression means may be implemented in conjunction with the power supply 180, or may be implemented separate from the power supply 180. In some embodiments, the suppression means comprise metal oxide varistors (MOVs) and/or fuse elements. In some aspects, the MOVs are configured to short when entering a failure state. Coupling such MOVs to a fuse may provide for a failure state that results in an open circuit instead of a short circuit, for example due to the fuse being tripped, which may increase the safety of the system 102.

The system 102 is also illustrated as comprising an optional remote enable unit 190. The remote enable unit 190 may be configured to notify the controller 150 of a user input on an input device, similar to the configuration of the enable unit 170. The remote enable unit 190 may be located at a distance from one or more of the other elements of the system 102. For example, the remote enable unit 190 may be attached to or in close proximity to the machine 120, thus alleviating an operator of the machine 120 from having to locate and travel to the enable unit 170 to cause the switch 160 to connect the transformer 110 and/or the machine 120 to the power source. In some embodiments, the remote enable unit 190 is wired to the system 102. In other embodiments, the remote enable unit 190 may communicate with the system 102 wirelessly. In some embodiments, the enable unit 170 is omitted from the system 102 when the remote enable unit 190 is included in the system 102.

The system 102 is further illustrated as comprising a setting selector 195. The setting selector 195 may comprise an input device that a user of the system 102 may manipulate to select a setting of the system 102. In one embodiment, the setting selector 195 comprises a switch that allows a user to select between a "fixed" timing setting and a "reset" timing setting.

In the "fixed" timing setting, the controller 150 maintains the switch 160 in a closed state for a predetermined amount of time that starts when the system 102 is activated by the enable unit 170 or the remote enable unit 190. After expiration of the predetermined amount of time, for example as determined by the timer 140, the controller 150 continues to maintain the switch 160 in the closed configuration until the current detector 130 detects that the current drawn by the machine 120 has fallen below a predetermined threshold. When the current drawn by the machine 120 falls below the predetermined threshold, the controller 150 causes the switch 160 to disconnect the power source from the transformer 110 and/or the machine 120.

The "fixed" timing setting allows an operator to have uninterrupted usage of the machine 120 for the predetermined amount of time. This may be advantageous in environments where the machine 120 is required to remain operational during a fixed shift or during certain business hours. For example, some machines utilize a startup and programming procedure that is time consuming and possibly quite costly. It may be beneficial to ensure that such machines remain ready for operation for a certain amount of time. Further, materials and/or operating time may be wasted if such machines lose any programming memory. The "fixed" timing setting may also be advantageous in factories or plants which are used for one work shift per day, or which are used for certain periods each day. The machines may thus be ready for operation during the shift of those certain periods, but would be inhibited from consuming energy while sitting unattended or idle outside of the shift or certain periods.

In the "reset" timing setting, the controller 150 maintains the switch 160 in a closed state for a predetermined amount of time after the current detector 130 detects that the current drawn by the machine 120 has fallen below a predetermined threshold. In this setting, the predetermined amount of time being monitored by the timer 140 may be reset each time the current drawn by the machine 120 falls below the predetermined threshold. After the reset, the timer 140 starts counting down the predetermined amount of time anew. If the current drawn by the machine 120 rises above the predetermined threshold before expiration of the predetermined amount of time, the timer 140 may cease counting down and the switch 160 will be maintained in the closed position. Upon the timer 140 determining that the predetermined amount of time has expired, however, the controller 150 will caused the switch 160 to disconnect the power source from the transformer 110 and/or the machine 120.

The "reset" timing setting may be advantageous for use with machines having little startup time and/or frequent down times. For example, an operator of one of these machines may frequently walk away to obtain materials or assist others in some situations. When the operator is present at the machine, it may be used substantially continuously with little idle time. When the operator leaves the machine unattended and/or idle, the timer 140 will begin to count down. Once the predetermined amount of time has elapsed, the machine will be disconnected from its power source.

In both of the settings described above, the switch 160 is opened when the current drawn by the machine 120 is below the predetermined threshold, for example as determined by the current detector 130, and the predetermined amount of time has elapsed, for example as determined by the timer 140. The setting selector 195, however, may be used to select when timer 140 initializes and/or resets the predetermined amount of time, and/or how the controller 150 controls the switch 160 in response to signals received from the timer 140 and/or the current detector 130.

In some embodiments, the setting selector 195 is a sliding toggle switch or lever that selects or enables a hardware configuration, for example a configuration of the timer 140 and/or the controller 150. In other embodiments, the setting selector 195 is a toggle switch, button, or other input that selects a software or firmware configuration, for example as implemented by a processor or microcontroller that performs the functions of the timer 140 and/or controller 150. The setting selector 195 may comprise any mechanism or device that may be used to select a setting. In some embodiments, the setting selector 195 comprises an option that is presented to a user on a display, and may be actuated by a mouse, trackball, touchscreen, or other input means. The setting selector 195 may be located remotely from one or more other elements of the system 102.

Figure 2:
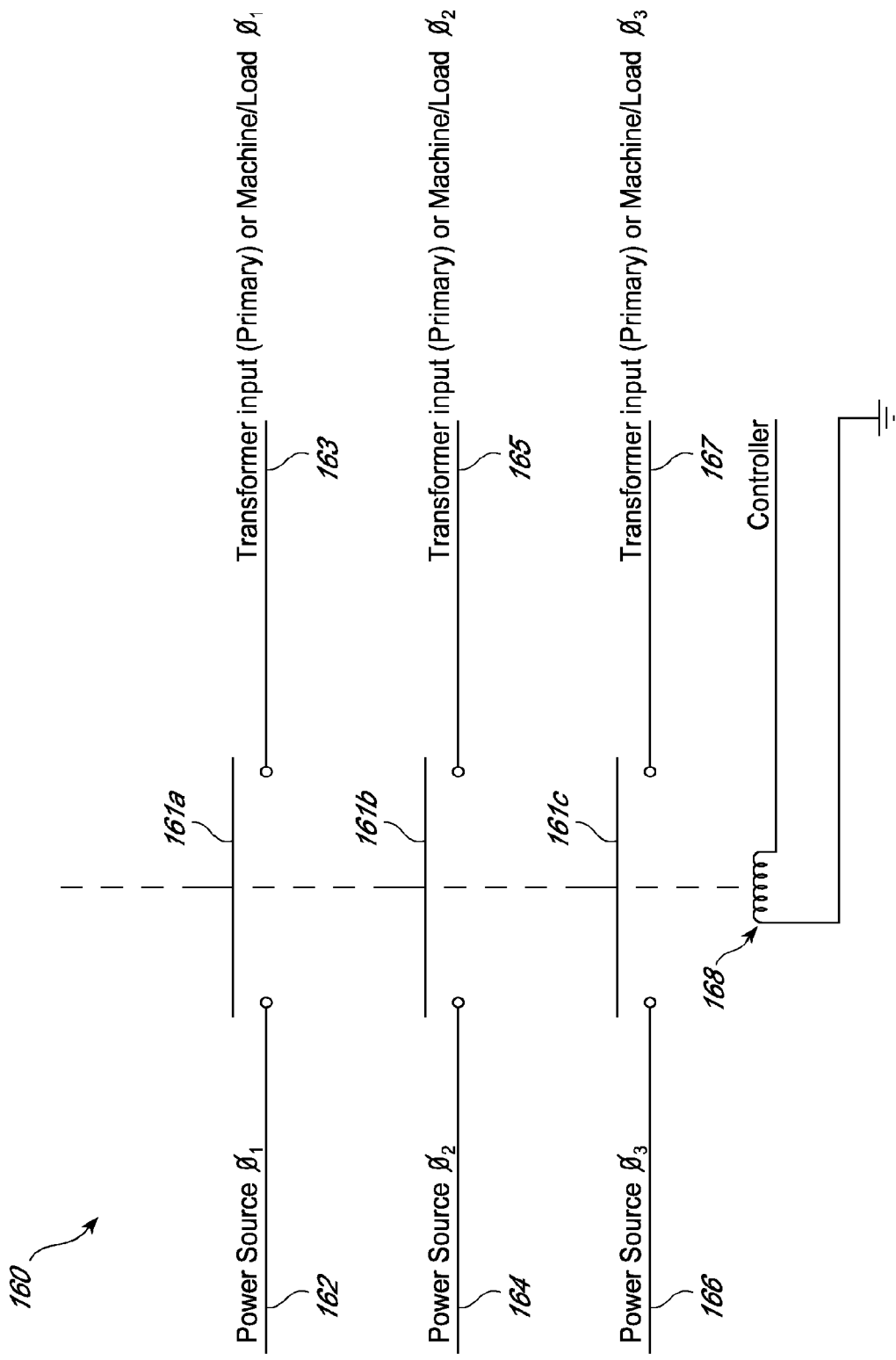
FIG. 2 illustrates an embodiment of a switch for use in the system of FIG. 1A or FIG. 1B.

FIG. 2 illustrates an embodiment of the switch 160. In the illustrated embodiment, the switch 160 is shown as being configured as a contactor. In this embodiment, and in further embodiments discussed herein, the power source is configured to provide three phases of alternating current, ($\Phi_1$, $\Phi_2$, and $\Phi_3$. In some embodiments, the power source provides 480VAC three phase power. In some embodiments, the power source provides a current of 27, 45, 90, or 120 amps a phase. Those of skill in the art will understand that other configurations of the power source may be used and/or accommodated. For example, a fewer or greater number of phases may be provided by the power source. The power source may further provide a greater or lesser voltage and/or amperage.

The phases $\Phi_1$, $\Phi_2$, and $\Phi_3$ are connected to inputs 162, 164, and 166 of the contactor. When a current above an actuation level is provided by the controller 150 to a coil 168, the conducting elements 161a, 161b, and 161c will cause the inputs 162, 164, and 166 to be connected to outputs 163, 165, and 167, which provide the phases $\Phi_1$, $\Phi_2$, and $\Phi_3$ to the transformer 110 or the machine 120.

The contactor may comprise a moving core that is attracted and held in position by the coil 168. In some embodiments, actuation means other than a coil and moving core are used to cause one or more inputs of the switch 160 to be selectively connected to one or more outputs of the switch 160. Those of skill in the art will appreciate other embodiments of the switch 160 and other embodiments of causing contactor inputs and outputs to be selectively connected.

Figure 3A:
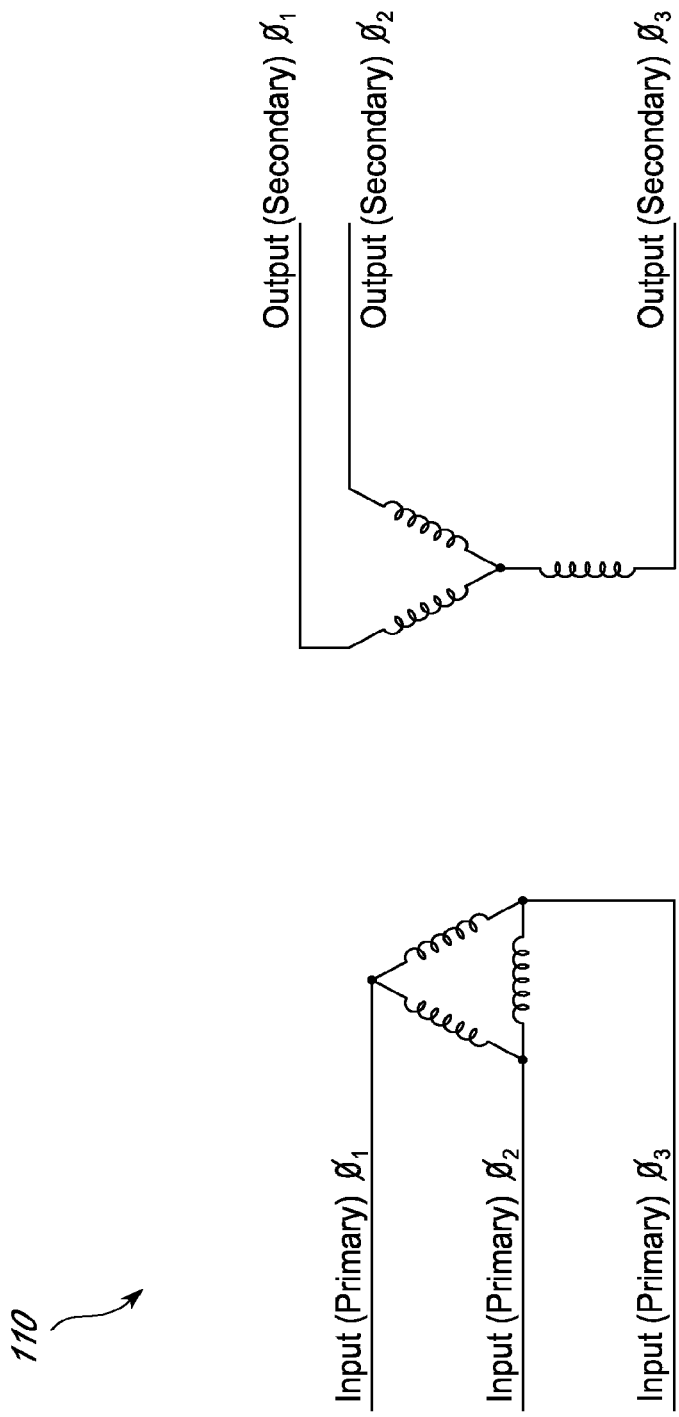
FIG. 3A is a schematic diagram of an embodiment of a transformer for use in the system of FIG. 1A or FIG. 1B.

FIG. 3A illustrates a schematic diagram of an embodiment of the transformer 110. In the illustrated embodiment, the transformer comprises a Delta/Wye transformer configured to transform 3-phase 208VAC to 3-phase 480VAC. The phases $\Phi_1$, $\Phi_2$, and $\Phi_3$ from the power source are input to a primary of the transformer 110, and are output from a secondary of the transformer 110 after being scaled.

Figure 3B:
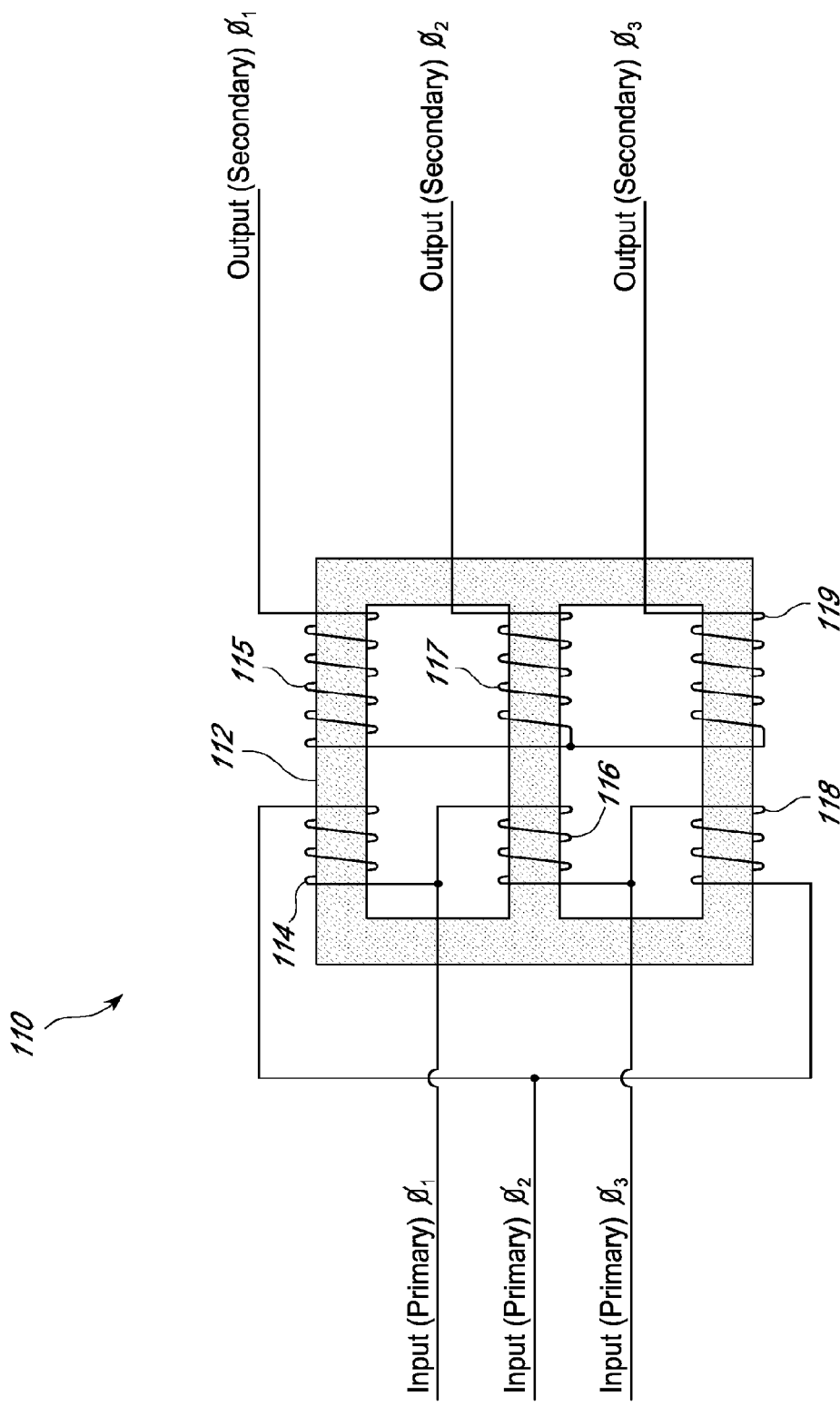
FIG. 3B is an illustration of a physical embodiment of the transformer of FIG. 3A.

FIG. 3B illustrates a physical embodiment of the transformer 110 showing how the Delta/Wye transforming illustrated in FIG. 3A may be implemented. The phases $\Phi_1$, $\Phi_2$, and $\Phi_3$ are wrapped around a core 112 to form primary windings 114, 116, and 118, respectively. Communication of electromagnetic energy from the primary windings 114, 116, and 118 through the core 112 to secondary windings 115, 117, and 119 causes the phases $\Phi_1$, $\Phi_2$, and $\Phi_3$ to be output in scaled form. In some configurations, a phantom current may be drawn by the transformer 110 due to excitation of the core 112 even when the machine 120 is powered off, for example due to eddy currents or hysteresis losses in the core 112. In some embodiments, such phantom current is consumed largely in one or more of the primary windings 114, 116, 118 and is dissipated as heat. Those of skill in the art will appreciate other embodiments of transformers which may be implemented, and other forms of phantom current that may be drawn. The transformer 110 may be configured to output an alternating current (AC) or a direct current (DC).

Figure 4:
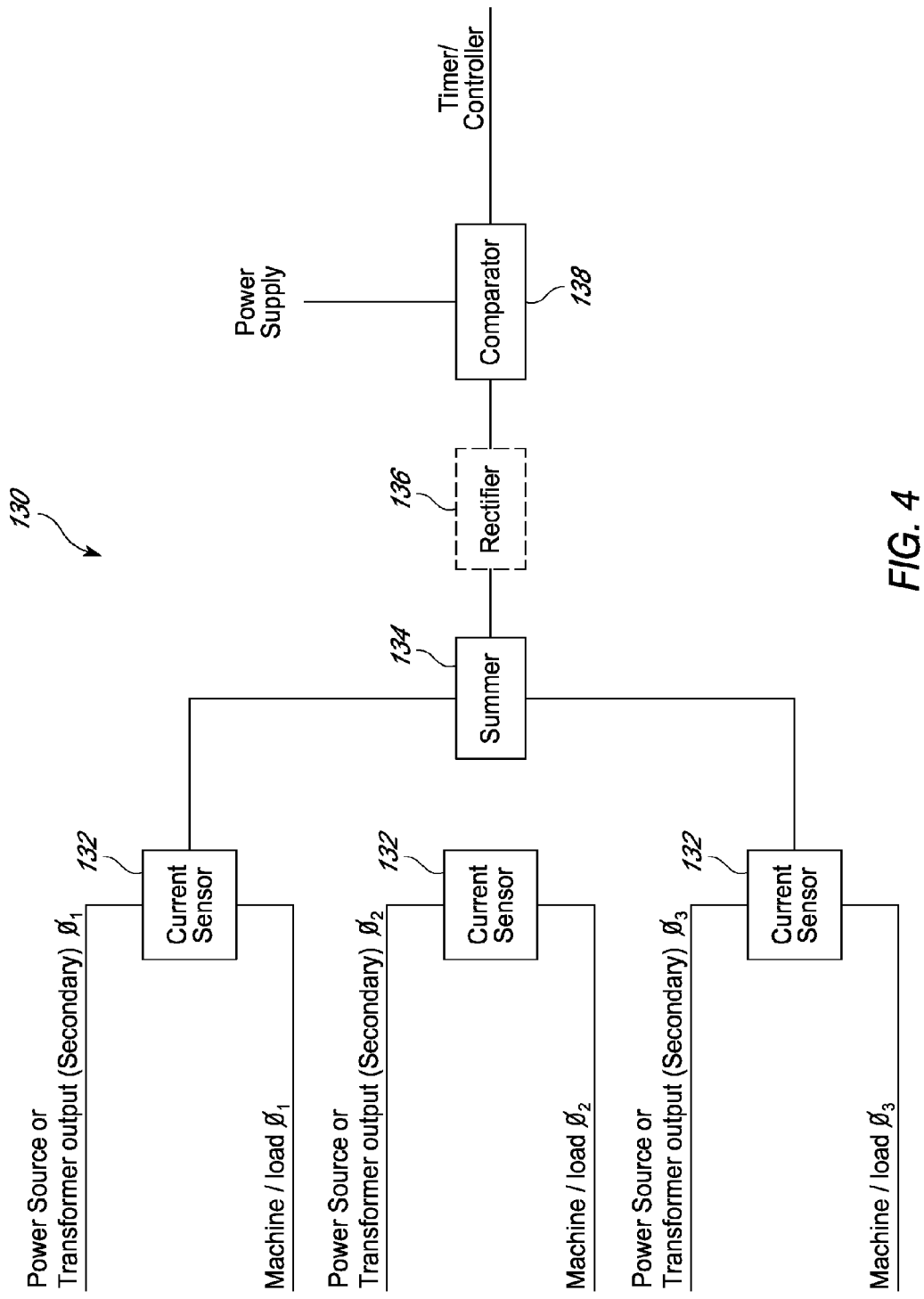
FIG. 4 is a functional block diagram of an embodiment of a current detection unit for use in the system of FIG. 1A or FIG. 1B.

FIG. 4 is a functional block diagram of an embodiment of the current detector 130. The current detector 130 may comprise one or more current sensors 132. In the illustrated embodiment, one current sensor 132 is associated with each of the phases $\Phi_1$, $\Phi_2$, and $\Phi_3$ output from the secondary of the transformer 110 or from the power source. In some embodiments, the current sensors 132 comprise transformers or Hall-effect sensors. In some embodiments, one or more of the current sensors 132 is configured to have a generally donut or toroidal shape that may be slipped over or otherwise encircle a wire or conductor carrying a phase from the power source or transformer 110. In this way, current can be passively sensed without substantially affecting or altering operation of the machine 120.

The current detector 130 may further comprise a summer 134 configured to sum the current sensed in each of the current sensors 132. In some embodiments, the summer 134 is omitted, for example when the current detector 130 is configured to receive only a single phase. Certain embodiments used to combine the sensed currents will be described in additional detail below.

The current detector 130 may further comprise a rectifier 136 configured to convert the summed current into a direct current, for example when the transformer 110 outputs an alternating current. In some embodiments, the rectifier 136 is omitted. For example, when the current sensors are used to detect a direct current, the rectifier may be omitted. In other embodiments, the sensing of the current may include a sampling procedure that obviates the use of a rectifier, for example as will be described in additional detail below. In some embodiments, rectification is performed by the current sensors 132. An advantage of such embodiments is that summation of rectified currents will not cancel out due to phase differences, thereby reducing the likelihood that the sensed current is incorrectly determined to have dropped below a predetermined threshold.

The current detector 130 further comprises a comparator 138 configured to compare the current sensed by the current sensor 132 (and in some embodiments the total current from the summer 134 and/or the direct current from the rectifier 136) to the predetermined threshold. In some embodiments, when the sensed current is below the threshold, the comparator 168 outputs the first signal to the timer 140 and/or the controller 150. The comparator 138 may be further configured to provide a second signal to the timer 140 and the controller 150 when the sensed current is greater than the predetermined threshold.

In some embodiments, the current detector 130 further comprises a filter (not shown). For example, the filter may be disposed between the summer 134 and the rectifier 136, or between the rectifier 136 and the comparator 138. In embodiments where the rectifier 136 is omitted or where rectification functionality is implemented in the current sensors 132 instead of subsequent to the summer 134, the filter may be implemented in place of the rectifier 136. The filter may reduce noise in a sensed signal, for example noise in a phase of an AC signal sensed by one of the current sensors 132. In some embodiments, each phase received from the power source or transformer 110 is associated with a filter. For example, each of the current sensors 132 may comprise a filter.

In some embodiments, one or more of the current sensors 132, summer 134, rectifier 136, comparator 138 and filter may be implemented at least partially in a processor or microcontroller. For example, a current sensor implemented using a resistive divider may be used to sample voltage and current several thousand time a second, for example at 2400 Hz. These samples may be used by a microprocessor to calculate a running root mean square (RMS) value of the sensed signal. An RMS of each phase may be calculated and added together, or the total RMS of all phases may be calculated. Thus, the microprocessor may implement functionality of the summer 134. In these embodiments, the RMS may be compared to the predetermined threshold by the microprocessor, for example. Thus, the microprocessor may also implement functionality of the comparator 138. Further, in such embodiments, one or both of the timer 140 and the controller 150 may be implemented in a microprocessor, as described above. In these implementations, the comparator 138 may pass a value or indicator to a function implementing the timer 140 and/or the controller 150 via software or firmware instead of outputting a signal to the timer 140 and/or the controller 150. In some embodiments, a signal may be digitized at the current sensor 132 and a processor may be used to analyze the waveform of the signal.

Figure 5:
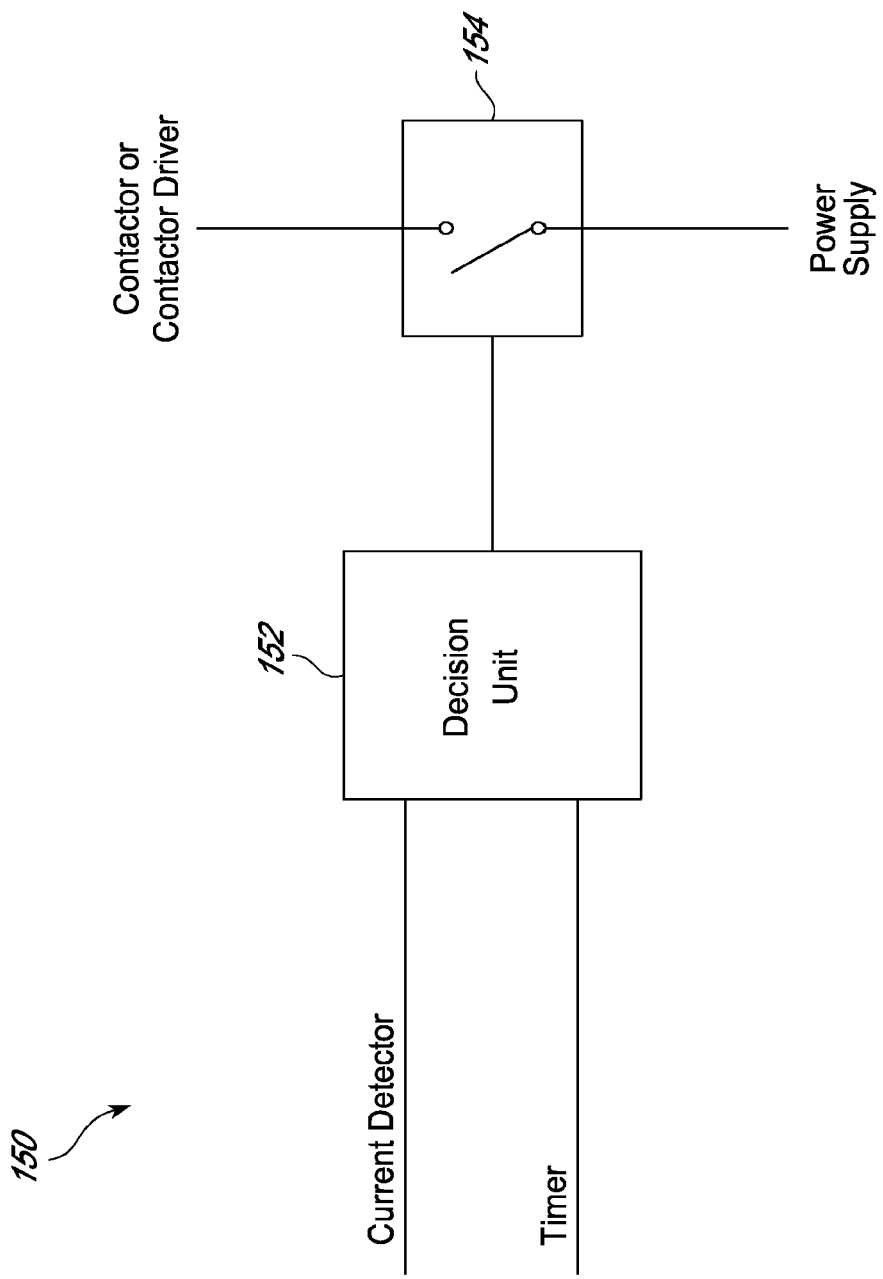
FIG. 5 is a functional block diagram of an embodiment of a controller for use in the system of FIG. 1A or FIG. 1B.

FIG. 5 is a functional block diagram of an embodiment of the controller 150. The controller 150 may comprise a decision unit 152 configured to determine whether to cause the switch 160 to break the circuit between the power source and the machine 120 or transformer 110 based on input received from the current detector 130 and/or the timer 140. In one embodiment, the decision unit 152 receives the first and/or second signals from the current detector 130 and the third signal from the timer 140. The decision unit 152 compares the signals from the current detector 130 and the timer 140 and decides when to connect to cause the contactor, or other embodiment of the switch 160, to open.

In some embodiments, at least a portion of the controller 150 is implemented in a microprocessor. For example, the decision unit 152 may be implemented as a process or function in the microprocessor configured to compare the values received from the current detector 130 and timer 140. When the current detector 130 indicates that the current is below the predetermined threshold and the timer 140 indicates that the predetermined amount of time has expired, the microprocessor may cause the switch 160 to disconnect the power source from the transformer 110 and/or the machine 120. In some embodiments, functionality of the current detector 130 and/or the timer 140 may be implemented in the same microprocessor as the controller 150 or in a different microprocessor. Thus, a function implementing the controller 150 may receive not only electrical signals from the current detector 130 and the timer 140, but may also be passed values in software or firmware.

In the illustrated embodiment, the controller 150 further comprises a switch 154 configured to selectively provide power from the power supply 180 to the contactor, for example when the contactor is used to implement the switch 160. The power supply 180 provides a current above the actuation level discussed above with respect to FIG. 2. In other embodiments, the switch 154 may be omitted and the decision unit 152 may supply a current above the actuation level when appropriate.

In some embodiments, the contactor comprises a normally-open contactor. In these embodiments, the decision unit 152 is configured to close the switch 154 to keep the contactor closed when the sensed current is at least as great as the predetermined value, for example as indicated by the second signal or absence of the first signal or corresponding values, or when the predetermined amount of time has not elapsed, for example as indicated by the absence of the third signal or a corresponding value. Thus, the decision unit 152 may be configured to close the switch 154 when receiving the second signal and/or in the absence of the third signal, or when the current detector 130 and/or the timer 140 provide values or indications signifying such situation. In these embodiments, if an error were to occur and the current from the power supply 180 were not supplied to the contactor, the contactor would default to the open state, which would disconnect the transformer 110 or the machine 120 from the power source. Such default may be beneficial, for example to ensure the safety of an operator of the machine 120 by turning the machine off.

In some embodiments, the contactor comprises a normally-closed contactor. In these embodiments, the decision unit 152 is configured to close the switch 154 to keep the contactor open when the sensed current is less than the predetermined amount, for example as indicated by the first signal or a corresponding value, and when the predetermined amount of time has elapsed, for example as indicated by the third signal or a corresponding value. Thus, the decision unit 152 may be configured to close the switch 154 when receiving both the first signal and the third signal from the current detector 130 and the timer 140, respectively, or when the current detector 130 and/or the timer 140 provide values or indications signifying such situation. In these embodiments, if an error were to occur and the current from the power supply 180 were not supplied to the contactor, the contactor would default to the closed state, which would essentially place the system 100 or 102 in a state similar to when the transformer 110 or the machine 120 is directly connected to the power source. Such default may be beneficial, for example to comply with certain electrical code requirements.

In some embodiments, neither the decision unit 152 nor the switch 154 directly drives the contactor. In these embodiments, the contactor may be driven by a contactor driver. The contactor driver may be implemented as a portion of the controller 150, or separate from the controller 150 in the system 100 or 102. The contactor driver may supply a high voltage to the contactor or other embodiment of the switch 160, while isolating other elements of the system 100 or 102 such as portions of the controller 150 from the high voltage. For example, in some embodiments of the system 100 or 102, one or more phases of voltage received from the power source are used to actuate the contactor. The contactor driver may selectively apply the voltage to the contactor based on an instruction or signal from the controller 150, as well as shield the controller 150 from the voltage. Such embodiment may not only may protect certain elements of the system 102 from damage, but may also reduce the likelihood that fields generated by high voltage in the transformer 110 would cause the controller 150 to reset or otherwise indicate that the contactor should remain closed when the machine 120 is drawing a current below the predetermined threshold. In some embodiments, elements of the controller 150 are rated for an input of between 100VAC and 240VAC, but the machine 120 receives 480VAC from the power source. In these embodiments, the contactor driver may switch the contactor without damaging the elements of the controller 150.

In some embodiments, the contactor driver comprises a triac and a triac driver. The triac and the triac driver may be used to power the switch 160 using an alternating current received from the power source. The triac driver may comprise an opto-isolated zero-crossing driver configured to manage the conduction state of the triac. When the triac is conducting the AC from the power source, a coil of the switch 160 may be energized, for example. The triac may comprise a snubberless triac. As described above, the triac and triac driver, or other implementation of the contactor driver, may therefore provide galvanic isolation in the system 100 or 102.

FIG. 6 is a functional block diagram of an embodiment of the enable unit 170. The enable unit 170 comprises an input device 172 for accepting an input from a user, as described above. The input device 172 may comprise a button configured to generate a signal, a lever, or any other input device. The input device 172 may be powered by a power supply, for example the power supply 180, and may generate a signal to send to the timer 140 in response to the user input. In some embodiments, a function in a processor or microcontroller monitors the input device 172 and alerts a function or process implementing the timer 140 and/or the controller 150, for example by calling the function or process or by passing a value thereto.

In some embodiments, the enable unit 170 further comprises a receiver 174 configured to receive a signal from the remote enable unit 190. The enable unit 170 may be configured respond to the signal received via the receiver 174 similar to how the reset circuit 170 responds to a user input at the input device 172. In some embodiments, the receiver 174 is included, but the input device 172 is omitted. The receiver 174 may include one or more antennas for wirelessly receiving the signal. In some embodiments, the receiver 174 is implemented in a wireless interface card that can be functionally coupled to or decoupled from the system 102. In some embodiments, the wireless interface card comprises an external antenna and/or a coaxial cable. The receiver may demodulate the received signal or perform any other number of receive functions.

FIG. 7 is a functional block diagram of an embodiment of the remote enable unit 190. The remote enable unit 190 comprises an input device 192 configured to receive an input from a user. In response to the user input, the remote enable unit 190 causes a transmitter 194 to transmit a signal, for example to the enable unit 170. The input device 192 may otherwise be configured similar to the input device 172. The transmitter 194 may transmit the signal over a wired connection, or may be configured to wirelessly transmit the signal. The transmitter 194 may include one or more antennas for wirelessly transmitting the signal, and may modulate the signal before transmission or perform any other number of transmit functions. In some embodiments, the signal is transmitted directly to the timer 140 without being passed through the enable unit 170.

Figure 8A:
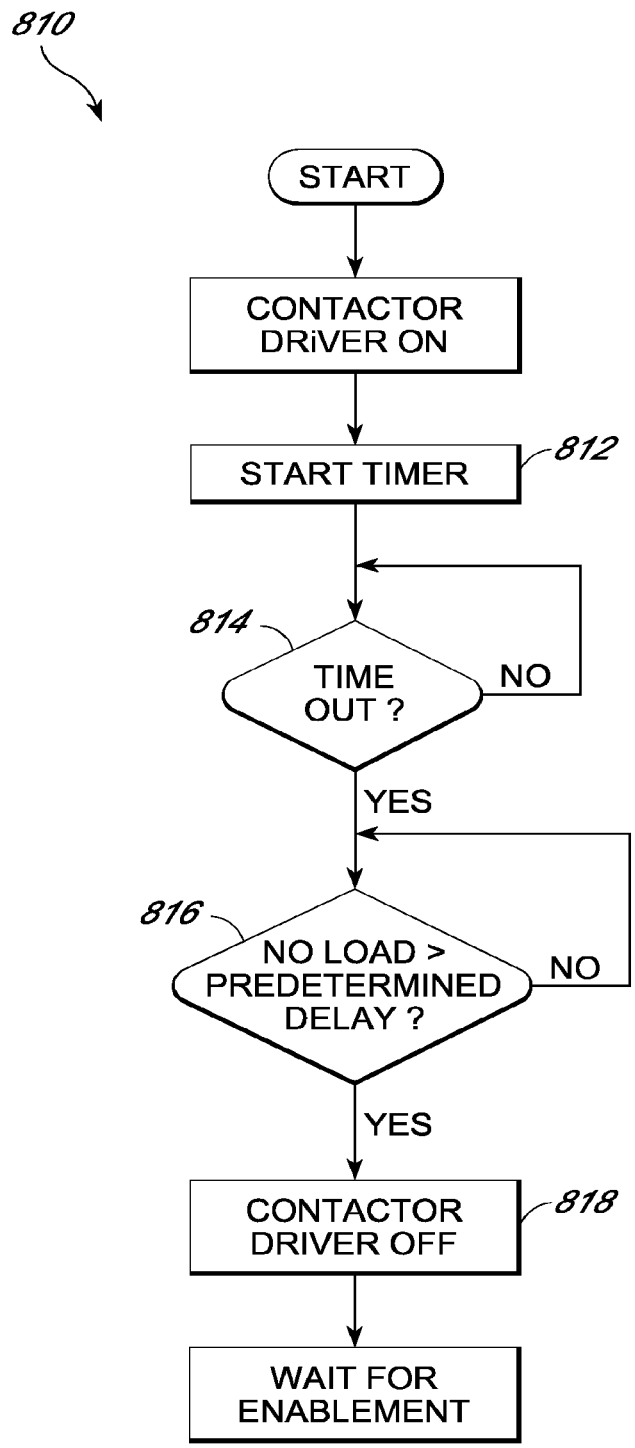
FIG. 8A is a flowchart illustrating a process for use by the system of FIG. 1A or FIG. 1B.

FIG. 8A illustrates an embodiment of a method 810 for use in the system 100 or 102 when configured in the "fixed" timing setting. In some aspects of the method 810, one or more steps of the method 810 are performed by a microprocessor implementing the functionality of one or more of the units or modules described above with respect to the systems 100 and 102. Although the method below will be described with respect to elements of the systems 100 and 102, those of skill in the art will appreciate that other components may be used to implement one or more of the steps described herein.

Method 810 starts with the switch 160 in the closed state. In the illustrated embodiment, the switch 160 is implemented by a contactor, and the contactor is held in the closed state by a contactor driver in an on state.

At 812, a timer is started. For example, the timer 140 may begin counting down a predetermined amount of time in response to actuation of the enable unit 170. The contactor remains in the closed state while the timer 140 is counting down at 814.

After the predetermined amount of time expires at 814, it is next determined whether no load has been detected for an amount of time that is greater than a predetermined delay at 816. In some embodiments, the timer 140 sends a signal such as the third signal or otherwise alerts the controller 150 that the predetermined amount of time has elapsed. In other embodiments, the controller 150 may periodically poll the timer 140 to determine if the predetermined amount of time has elapsed.

A load may be detected by the current detector 130, for example. When the current detector 130 senses that the current has been below the predetermined threshold for greater than the predetermined delay, for example using the comparator 138, the switch 160 is placed in an open state at 818. In the illustrated embodiment, step 818 includes turning the contactor driver off. For example, the controller 150 may be used to instruct the contactor driver to stop supplying a voltage to the contactor when the contactor is configured as a normally-open contactor. Subsequent to the contactor driver being turned off, the system 100 or 102 is idle and waits for enablement.

In some embodiments, the predetermined delay is set prior to connecting the machine 120 to the system 100 or 102. In other embodiments, the predetermined delay is set by a technician after coupling the machine 120 to the system 100 or 102. The predetermined delay may be used to account for a negligible drop in the sensed current or to ensure that any detected load is not due to wavering of the sensed current, for example due at least in part to an RC constant as will be described in additional detail below. In some embodiments, the predetermined delay is set to approximately 50 milliseconds. A method of setting the predetermined delay is described in additional detail below.

Figure 8B:
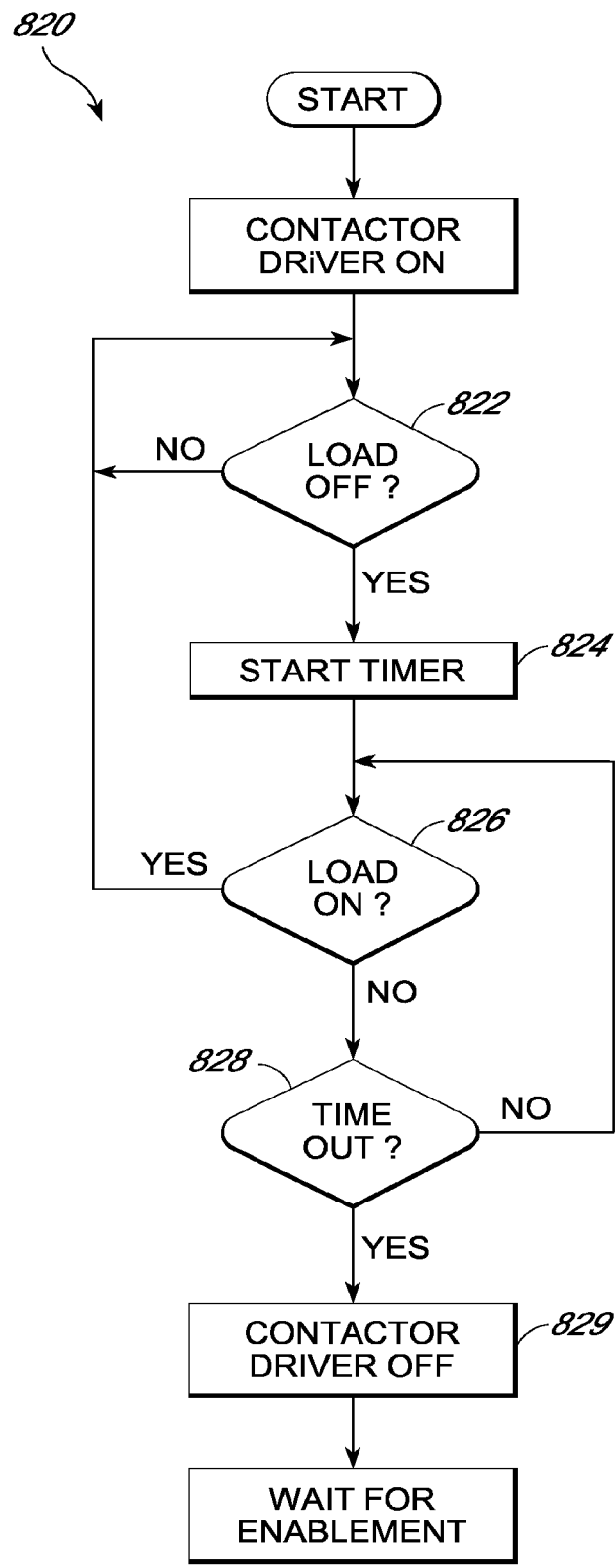
FIG. 8B is a flowchart illustrating a process for use by the system of FIG. 1A or FIG. 1B.

FIG. 8B illustrates an embodiment of a method 820 for use in the system 100 or 102 when configured in the "reset" timing setting. In some aspects of the method 820, one or more steps of the method 820 are performed by a microprocessor implementing the functionality of one or more of the units or modules described above with respect to the systems 100 and 102. Although the method below will be described with respect to elements of the systems 100 and 102, those of skill in the art will appreciate that other components may be used to implement one or more of the steps described herein.

Method 820 starts with the switch 160 in the closed state. In the illustrated embodiment, the switch 160 is implemented by a contactor, and the contactor is held in the closed state by a contactor driver in an on state.

At 822, it is determined whether a load is off. For example, the current detector 130 may determine that the load is off by using the comparator 138 to sense when the current drawn by the machine 120 is below the predetermined threshold.

At 824, a timer is started. For example, the timer 140 may begin counting down a predetermined amount of time in response to reception of the first signal from the current detector 130. The contactor remains in the closed state while the timer 140 is counting down at 826.

If a load is detected at 826 before expiration of the timer, operation returns to 822 where it is determined whether the load is off. The load may be detected by the current detector 130 sensing that the machine 120 is drawing a current greater than the predetermined threshold, for example, and the current detector 130 may instruct the timer 140 to stop or restart the time, for example by passing a value to the timer 140 or by transmitting the second signal.

If the predetermined amount of time expires at 828, the switch 160 is placed in an open state at 829. In the illustrated embodiment, step 829 includes turning the contactor driver off. For example, the controller 150 may be used to instruct the contactor driver to stop supplying a voltage to the contactor when the contactor is configured as a normally-open contactor. In some embodiments, the timer 140 sends a signal such as the third signal or otherwise alerts the controller 150 that the predetermined amount of time has elapsed. In other embodiments, the controller 150 may periodically poll the timer 140 to determine if the predetermined amount of time has elapsed. Subsequent to the contactor driver being turned off, the system 100 or 102 is idle and waits for enablement.

Figure 9:
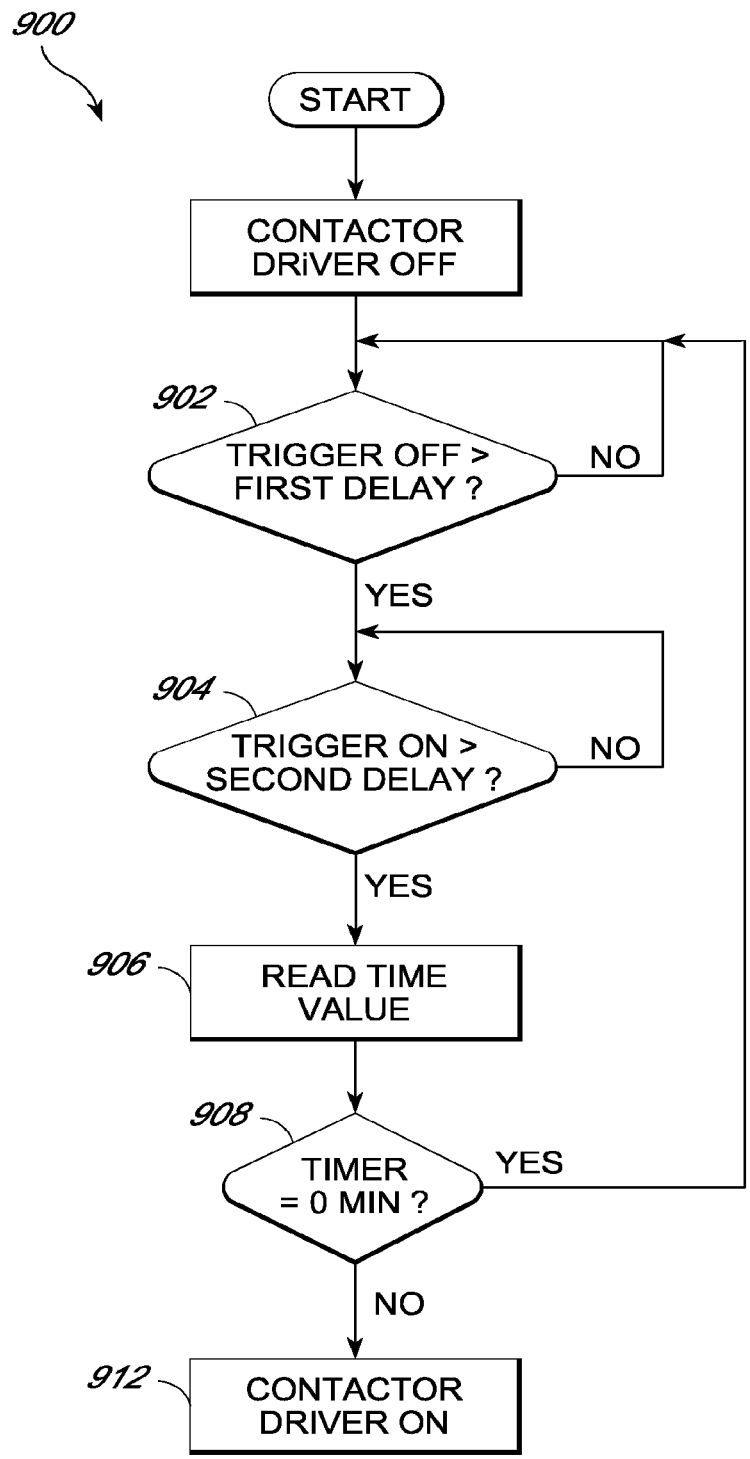
FIG. 9 is a flowchart illustrating a process for use by the system of FIG. 1A or FIG. 1B.

FIG. 9 illustrates an embodiment of a method 900 for use in the system 100 or 102 when the system is idle or waiting for enablement. In some aspects of the method 900, one or more steps of the method 900 are performed by a microprocessor implementing the functionality of one or more of the units or modules described above with respect to the systems 100 and 102. Although the method below will be described with respect to elements of the systems 100 and 102, those of skill in the art will appreciate that other components may be used to implement one or more of the steps described herein.

Method 900 starts with the switch 160 in the open state. In the illustrated embodiment, the switch 160 is implemented by a contactor, and the state of the contactor is selector by a contactor driver. At the start of the method 900, the contact driver does not supply a current to the contactor sufficient to maintain the contactor in the closed state when the contactor is configured as a normally-open contactor. For example, the controller 150 may be used to instruct the contactor driver not the supply the current. The method 900 may be initiated in response to the method 810 or 820 terminating, as described above with respect to FIGS. 8A and 8B, respectively.

At 902, it is determined whether a trigger has been received within a first delay. The trigger may comprise an indicator, value, or signal signifying that the enable unit 170 or the remote enable unit 190 was actuated, and may be received at the controller 150, for example. If a trigger was received within the first delay, the method 900 restarts.

Performing step 902 may cause the system 100 or 102 to wait for at least the first delay, thereby ensuring that no trigger is received for an amount of time that is at least as long as the first delay before determining whether to close the contactor. In some embodiments, the first delay at 902 may account for any transients that may be errantly detected when the contactor is switching from a closed state to an open state, for example at 818, 829. In some embodiments, the first delay comprises approximately 1 second. In some embodiments, the first delay is set prior to connecting the machine 120 to the system 100 or 102. In other embodiments, the first delay is set by a technician after coupling the machine 120 to the system 100 or 102. A method of setting the first delay is described in additional detail below.

After it is determined that no trigger has been received within the first delay, it is determined whether a trigger is held on for more than a second delay at 904. In some embodiments, the controller 150 determines whether an indicator, value, or signal signifying that the enable unit 170 or the remote enable unit 190 was actuated has been received. In other embodiments, the controller 150 periodically polls the enable unit 170 and/or the remote enable unit 190.

Performing step 904 may cause the system 100 or 102 to evaluate whether the trigger is due to a user input, for example at the input 172 or 192, to enable the system or due to noise in a signal sensed at the current detector 130 being erroneously interpreted as a trigger. Using step 904, however, such noise can effectively be filtered out or ignored.

In some embodiments, the second delay is set prior to connecting the machine 120 to the system 100 or 102. In other embodiments, the second delay is set by a technician after coupling the machine 120 to the system 100 or 102. In some embodiments, the second delay comprises approximately 50 milliseconds. In other embodiments, the second delay comprises approximately 100 milliseconds. In some embodiments, the second delay is substantially equivalent to the predetermined delay discussed with respect to FIG. 8A. A method of setting the second delay is described in additional detail below.

If the trigger is on for more than the second delay at 904, then a value of the predetermined amount of time is read or ascertained at 906. For example, the controller 150 may determine the predetermined amount of time based on a setting of the timer 140. In other embodiments, step 906 is performed by the timer 140. If the predetermined amount of time is set to zero, then the method 900 restarts.

If it is determined that the predetermined amount of time is not set to zero at 908, the switch 160 is placed in the closed state at 912. In the illustrated embodiment, 912 includes turning the contactor driver on. For example, the controller 150 may be used to instruct the contactor driver to supply a voltage to the contactor to maintain the contactor in an electrically conductive state when the contactor is configured as a normally-open contactor.

Subsequent to turning on the contactor driver at 912, either the method 810 or the method 820 may be initiated based on how the system 100 or 102 is configured. In embodiments including the setting selector 195 where the system 100 or 102 may be placed in either a "fixed" timing setting or a "reset" timing setting," the method 900 may also comprise determining which setting to implement. For example, the controller 150 may determine the setting based on a positioning or input of the setting selector 195.

Figure 10:
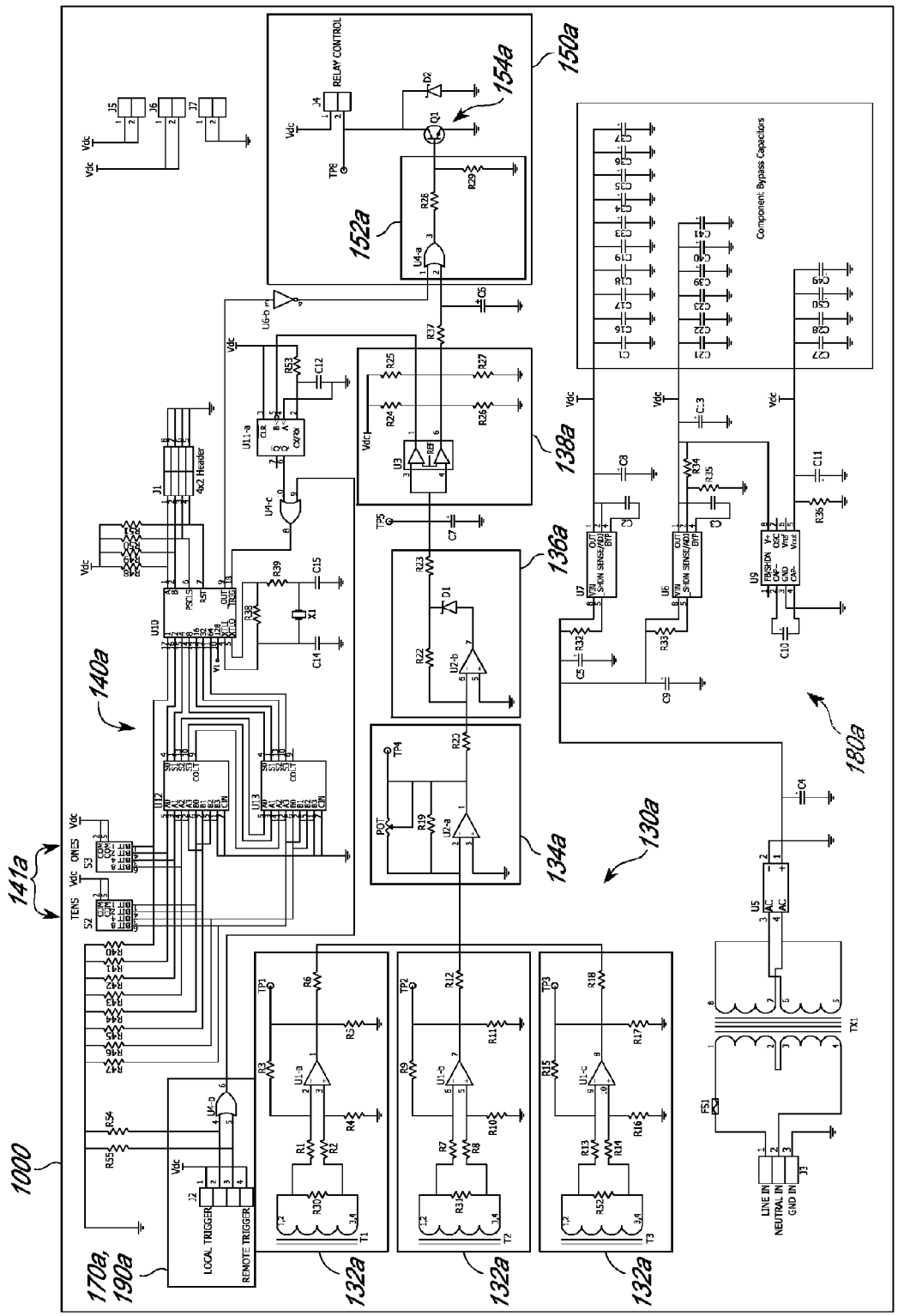
FIG. 10 is a schematic diagram of an embodiment of a device for reducing phantom load.

FIG. 10 is a schematic diagram of an embodiment of a device 1000 for reducing phantom load. The device 1000 may be implemented in the system 100 or 102, for example. The device 1000 may be configured for communication with the transformer 110 and/or the machine 120. The illustrated embodiment of the device 1000 comprises circuitry components implementing the current detector 130, the timer 140, the controller 150, the enable unit 170, and the power supply 180. These circuitry components are identified by reference numerals corresponding to the elements described with respect to FIGS. 1A and 1B, but have the letter "a" appended to the end of the reference numerals. The device 1000 may further comprise a contactor, as described above. A current detector circuit 130a comprises three current sensors 132a, a summation circuit 134a, a rectifier circuit 136a, and a comparator circuit 138a. A controller circuit 150a comprises a determination circuit 152a and a switch 154a. The device 1000 may be configured to implement the method 820, for example.

The device 1000 may be used to save a phantom current. As described above, a phantom current may refer to a current that is drawn from a power, voltage or electricity source when a device or machine connected to that source is off. In the illustrated embodiment, the device 1000 is configured to save phantom current in a transformer having three secondary windings or in a machine that draws current from three phases of a power source when in an idle or standby state. The outputs of the transformer or power sources are carried by conductors through the device 1000 at T1, T2, and T3. In some embodiments, the device 1000 will save energy from being wasted in the primary of the transformer, for example, which in previous systems would remain powered even when a load connected to the transformer is turned off. As described above, the energy may be dissipated in the primary winding(s) of the transformer by eddy currents or hysteresis losses in the core. The device 1000, on the other hand, may be configured to detect the absence of a load and disconnect the primary from a power source after a selected delay. In other embodiments, the device 1000 may be configured to detect the absence of a load when a machine is in a standby state and disconnect the machine from the power source after the selected delay.

In the illustrated embodiment, a contactor of the device 1000 is normally open. At the beginning of a work shift, for example, an operator of a machine may command the contactor to close, for example using an enable circuit 170a or a remote enable circuit 190a. An enable command may be communicated to the controller circuit 150a through the timer circuit 140a, which signals the controller circuit 150a to close the contactor and may ensure that the contactor will remain closed for at least the selected time while the machine is powered up.

The current flowing in each phase of the secondary of the transformer or to each phase of the machine is sensed by the current sensors 132a. In the illustrated embodiment, the current sensors 132a comprise a sensing coil encircling a conductor carrying the phases output by the transformer.

The currents sensed by the current sensors 132a are summed by the summation circuit 134a. In the illustrated embodiment, the summation circuit 134a comprises a summing amplifier in combination with an adjustable potentiometer. A user may adjust the potentiometer to affect the gain output at the amplifier in order to tune the total sensed current, thereby effecting a change in the current being compared to the predetermined threshold.

The summed currents are converted to a DC voltage by the rectifier circuit 136. In the illustrated embodiment, the rectifier circuit 136a comprises an amplifier in combination with a diode.

The DC voltage is compared to the predetermined threshold by the comparator circuit 138a, which determines if the DC voltage exceeds the predetermined threshold. If so, a high signal is output by the comparator circuit 138a to the controller circuit 150a.

In the illustrated embodiment, the controller circuit 150a comprises an OR gate used to implement the determination circuit 152a. When receiving the high signal from the comparator circuit 138a, the OR gate sends a signal to the switch 154a, which is illustrated as a transistor in this embodiment and causes a power supply 180a to connect a current above the actuation level to the contactor, thereby holding the contactor closed. Thus, the current is continually sensed, and a high output continually output by the comparator circuit 138a while the total current is above the predetermined threshold. This causes the controller circuit 150a to energize the transistor, keeping the contactor energized by the power supply 180a and the transformer connected to the machine.

When the total sensed current drops below the predetermined value, the load may no longer be in use. The comparator circuit 138a outputs a low signal to the timer circuit 140a, which starts a timer for the selected time. During the selected time, the timer circuit 140a outputs a high signal to the controller circuit 150a, which causes the contactor to remain closed. If the current remains under the predetermined threshold until the end of the selected time, the timer circuit 140a will output a low signal. If the signal from the comparator circuit 138a is also low, the controller circuit 150a will disconnect the contactor from the power supply 180a, causing the contactor to disconnect the transformer from the machine. If a current above the predetermined threshold is sensed during the selected time, the timer may be stopped. A user may select the time using input means 141a.

With reference to the specific components illustrated in FIG. 10, when the enable circuit 170a is activated, for example by the trigger J2, the output of U4-b goes HIGH followed by the output of U4-c, thus triggering the start of the Timer U10. The Timer U10 is configured so that in response to a LOW to HIGH input, the OUT pin goes LOW. The inverter U6-b output therefore goes HIGH followed by the output of U4-a turning ON transistor Q1. This causes a DC voltage to be applied to the contactor, for example to the coil 168 of the contactor, which closes the contactor.

The primary of the transformer will thus turn ON or the power source will be connected to the machine. Current will flow from the secondary or the power source to the load, and is detected by the current sensing transformers and amplified in the current sensors 132a. The three current phases are summed by the summation circuit 134a and rectified by the rectifier circuit 136a, which triggers the comparator circuit 138a. This holds a HIGH at the input 2 of U4-a as long as there is sufficient current detected in the sensing circuit.

The timer will continue counting up to the time selected by S2 and S3 (at the input 141a). After the time expires the contactor will remain closed due to the current detected by the current detector 130a.

When the operator turns the machine or load OFF, for example at the end of a shift in a typical industrial shop, the current detector circuit 130a no longer detects a current above the predetermined threshold. The input to U3 drops and the output of U3 goes LOW. This sends, through U11-a and U4-c, a HIGH to the input of the Timer U10, which starts counting. The OUT of U10 remains low until the time expires, which maintains the input to U4-a high by virtue of the inverter U6-b. The timer is used to prevent accidental shut OFF during short periods of very low current (such as during breaks or warm-ups). When the timer expires, counting pin OUT goes HIGH. The inverter U6-b output therefore goes LOW, followed by the output of U4-a turning OFF transistor Q1. This causes the DC voltage to be removed from the contactor, for example from the control coil 168 of the contactor, which opens the connection between the power source and the transformer or the machine.

Those of skill in the art will appreciate that the machine does not have to be completely OFF in order for the device 1000 to disconnect the transformer or the power source. If the current is lower than the predetermined threshold value, then the transformer or the power source will be disconnected. This feature allows the device 1000 to not only save phantom current in the transformer, but also current that the machine uses in stand-by mode (e.g., when the machine is ON but not in use).

In embodiments where the contactor is normally closed, U4-a may be changed to a NOR gate. In this case, current will not be provided to the contactor by the controller circuit 150a when either the output of U3 is HIGH or when the output of U6-b is HIGH. Current will only be provided to the coil 168 by Q1, which will cause the contactor to open and disconnect the transformer or to disconnect the machine from the power source, when both the output of U3 is LOW (i.e. the total sensed current is below the threshold) and the output of U6-b is LOW (i.e. the timer has expired).

In embodiments where the contactor is normally closed, U4-a may instead be changed to an AND gate, and the inverter U6-b may be moved to the output of U3. In this case, U3 will output LOW when the total sensed current is greater than or equal to the predetermined threshold, and HIGH when the total sensed current is less than the predetermined threshold. U10 will output HIGH when the timer expires, and LOW at other times. U4-a will not connect the contactor to the actuation current when the output of U3 is LOW (i.e. the total sensed current is at least as great as the predetermined threshold) or when the output of U10 is LOW. Q1 will only connect the contactor to the actuation current, causing the contactor to disconnect the transformer or to disconnect the machine from the power source, when the output of U3 is HIGH (i.e. the total sensed current is less than the predetermined threshold) and the output of U10 is HIGH (i.e. the timer has expired).

The device 1000 may further comprise an interface configured to provide information regarding the current sensed in one or more of the current sensors 132a or the total sensed current as combined in the summation circuit 134a. The information may be provided to a computer or workstation. The computer may be configured to monitor or track the current, and may calculate statistics or summaries based on information received via the interface. The computer may be further configured, for example using appropriate software, to accumulate, display, and/or analyze the data. Such functionality may be accessed, controlled, or used through a remote applet. Such remote applet or program may further be configured to individually control one or more of the elements described with respect to the device 1000. The device 1000 and/or computer may be configured for data linking, and information indicative or descriptive of detected loads may be stored or manipulated using various system cards.

Figure 11:
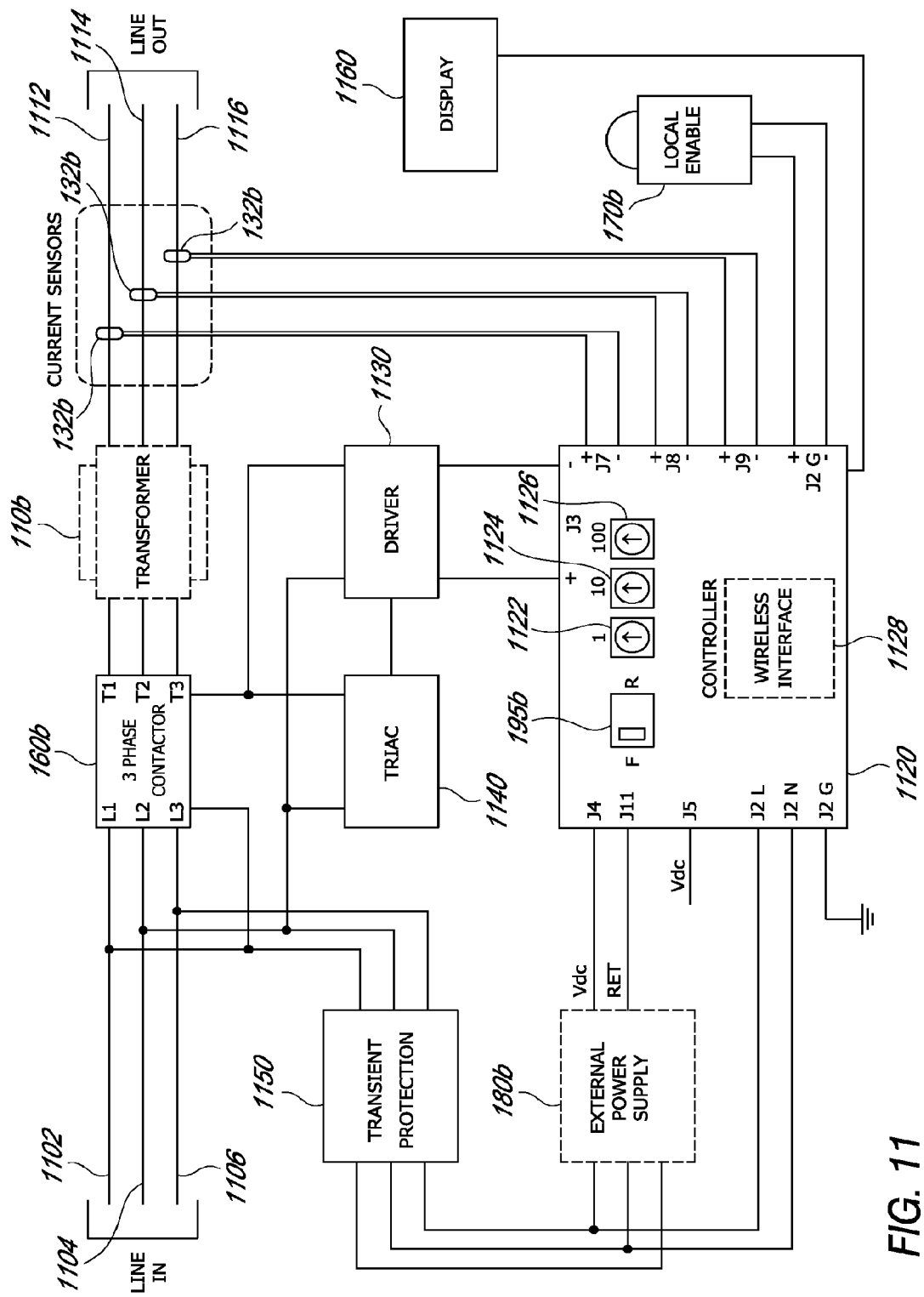
FIG. 11 is a functional block diagram of an embodiment of a system for reducing phantom load.

FIG. 11 illustrates a functional block diagram of an embodiment of a system 1100 for reducing phantom load. The system 1100 may implement functionality of the system 100 or 102, and is illustrated as including additional functionality as will be described below. The system 1100 is further illustrated as comprising components that implement embodiments of the transformer 110, switch 160, enable unit 170, and power supply 180 illustrated above with respect to FIGS. 1A and/or 1B. The embodiments of these components are identified by reference numerals corresponding to the previously illustrated elements, but have the letter "b" appended to the end of the reference numerals.

The system 1100 comprises an input for electrical connection to a power source, and an output for electrical connection to a machine or other load, such as the machine 120 described above. The input may comprise a plug, wire, or any other connector or conductor configured to carry a signal from the power supply, or a plurality of any such mechanisms. In the embodiment illustrated in FIG. 11, the input is shown as connectors 1102, 1104, and 1106 for coupling to respective phases of the power supply. The output may comprise a receptacle, wire, or any other connector or conductor configured to carry a signal to a machine or load, or a plurality of any such mechanisms. In the embodiment illustrated in FIG. 11, the output is shown as connectors 1102, 1104, and 1106 for providing each of three phases of power to the machine.

The system 1100 further comprises a switch 160b coupled to the inputs 1102, 1104, 1106. The switch 160b may be configured to make or break a circuit between inputs and outputs of each of the three phases of power received from the power source. In the illustrated embodiment, the switch 160b is shown as comprising a 3-phase contactor.

The system 1100 is further illustrated as comprising a transformer 110b. The transformer 110b may be configured to scale each of the phases of current from the outputs of the switch 160b and provide each of the scaled phases to the outputs 1112, 1114, 1116. In some embodiments, the transformer 110b is omitted, and the outputs of the switch 160b are coupled directly to the outputs 1112, 1114, and 1116.

Current sensors 132b are associated with each of the phases output from the transformer 110b or the switch 160b when the transformer 110b is omitted. The current sensors 132b may be configured to passively sense current being drawn at each of the outputs 1112, 1114, 1116. A portion of the functionality of sensing current may be implemented in a controller 1120 coupled to the current sensors 132b.

The controller 1120 may further implement functionality of the current detector 130 besides the current sensors 132. In addition, the controller 1120 may implement functionality of the timer 140 and the controller 150. The controller 1120 is illustrated as comprising a setting selector 195b for selecting between the "fixed" timing setting and the "reset" timing setting described above. The setting selector 195b is shown in FIG. 11 as a sliding toggle switch.

The controller 1120 is further illustrated as time selectors 1122, 1124, and 1126. The time selectors 1122, 1124, and 1126 may be used to set the predetermined amount of time discussed above. In the illustrated embodiment, each of the time selectors 1122, 1124, and 1126 comprises a rotary switch that selects a value of the predetermined amount of time in minutes. The time selector 1122 may be set to any value from 0-9 to select single minutes, the time selector 1124 may be used to any value from 0-9 to select tens of minutes having a value of 0-9, and the time selector 1126 may be used to any value from 0-9 to select hundreds of minutes. In this way, the predetermined amount of time may be set from anywhere between 0 and 999 minutes.

The controller 1120 is illustrated as additionally comprising a wireless interface 1128. The wireless interface 1128 may comprise or be configured to accept a receiver to receive a wireless signal, for example from a remote enable unit such as the remote enable unit 190 illustrated in FIG. 1B. In some embodiments, the wireless interface 1128 comprises a socket configured to accept a wireless interface card, which was described above. Embodiments of the controller 1120 will be described in further detail below. In some embodiments, the wireless interface 1128 is omitted.

In some embodiments, the system 1120 includes a network interface. The network interface may be implemented by the wireless interface 1128 or by a network card coupled to the wireless interface 1128. In one embodiment, the network interface is addressable using an IP address. Thus, a central computer or monitoring station may be used to send instructions to or read data from each controller. For example, the system 1100 may be installed at a plurality of different machines, and each of the installed systems independently addressed using the IP address associated with the respective network interface. In some embodiments, the installed systems may communicate with each other. For example, the controllers of each of the installed systems may communicate to ensure that a total current being drawn is within a safe range or to ensure that less than a preset number of machines are being enabled concurrently. Concurrent enablement of machines may cause the current drawn to substantially spike, which may be a safety hazard or may increase the rate that a company running the machines is charged for electricity. Of course, a central computer or monitoring station may be used to coordinate such parameters as well. In some embodiments, the network interface is implemented separate from the wireless interface 1128. In some embodiments, the network interface comprises a wired connector such as an Ethernet or LAN connector.

The controller 1120 may be configured to cause the switch 160b to selectively open or close, for example based on inputs received from the current sensors 132b and/or an enable unit 170b. In the illustrated embodiment, the enable unit 170b is shown as being a local enable unit coupled to the controller 1120.

The controller 1120 may instruct a triac driver 1130 to drive a triac 1140 so as to selectively open or close the switch 160b. As shown in FIG. 11, the triac drive 130 is coupled to the controller 1120 and the triac 1140. The triac 1140 is coupled to the switch 160b and at least one of the inputs 1102, 1104, 1106. Functionality of the triac was described above.

The controller 1120 may be insulated from transients by a transient protection unit 1150 coupled between the inputs 1102, 1104, 1106 and the controller 1120. Means for suppressing transients and the functionality thereof was described above.

In some embodiments, an optional power supply 180b is coupled between the transient protection unit 1150 and one or more inputs of the controller 1120. In the illustrated embodiment, the power supply 180b is shown as comprising an external power supply. In some embodiments, the controller 1120 comprises an internal configured to handle certain ranges of voltages, for example 100VAC-240VAC. In such embodiments, the external power supply 180b may be used when the power received from the power source is out of the ranges, for example when the received power is substantially higher. In one embodiment, the power supply 180b is used when the power source supplies approximately 480VAC.

The system 1100 may further comprise a display 1160 configured to display information from the controller 1120. The information may include time that the switch 160b has been closed, the predetermined threshold or the predetermined amount of time, and the whether the switch 160b is currently closed or open. The display 1160 may also display warnings or alerts such as when the current drawn by a machine coupled to the outputs 1112, 1114, 1116 exceeds a safe level or when the machine has been operated for a length of time that is unsafe. Other information may be displayed on the display 1160 as well. In some embodiments, the display includes a computer for processing data or for providing instructions to the controller 1120.

Figure 12:
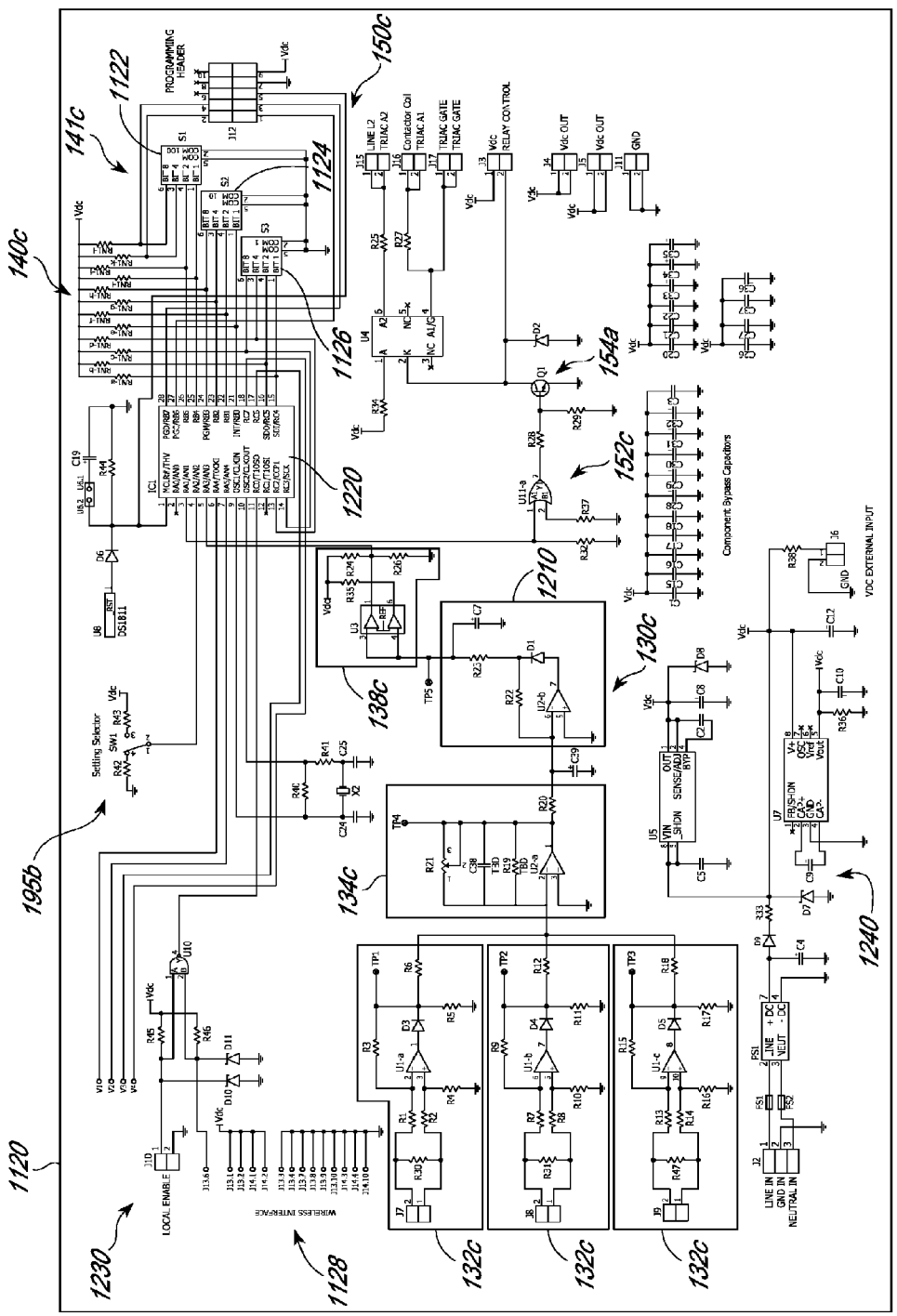
FIG. 12 is a schematic diagram of an embodiment of a controller for use in the system of FIG. 11.

FIG. 12 is a schematic diagram of an embodiment of the controller 1120. The illustrated embodiment of the controller 1120 comprises components implementing the current detector 130, the timer 140, and the controller 150. These components are identified by reference numerals corresponding to the elements described with respect to FIGS. 1A and 1B, but have the letter "c" appended to the end of the reference numerals. A current detector circuit 130a comprises three current sensors 132c, a summation circuit 134c, a filter circuit 1210, and a comparator circuit 138c.

A microcontroller 1220 may implement functionality of at least a portion of a timer 140c and a controller 150c. The timer 140c may comprise input means 141c and the microcontroller 1220. The input means 141c may include time selectors 1122, 1124, and 1126 coupled to the microprocessor 1220 for selecting the predetermined amount of time. The controller 150c may comprise an OR gate U11-a coupled to the microcontroller 1220, a switch 154c coupled to the OR gate U11-a, and the microcontroller 1220. In some embodiments, the microcontroller 1220 and the OR gate U11-a implement functionality of a decision unit 152c. In some embodiments, the OR gate U11-a is omitted. In FIG. 12, the switch 154c is illustrated as a transistor.

In the illustrated embodiment, the current sensors 132c receive signals from the current sensors 132b. The current sensors 132c are otherwise configured similar to the current sensors 132a illustrated in FIG. 10, except that the current sensors 132c rectify the received signals using a diode.

The summation circuit 134c is configured to perform a function similar to the summation circuit 134a. The summation circuit 134c, however, is illustrated as including an additional capacitor to smooth the rectified signals received from the current sensors 132c. Similar to the operation of the summation circuit 134a, a user may adjust a potentiometer in the summation circuit 134c to affect the gain output at the amplifier in order to tune the total sensed current, thereby effecting a change in the current being compared to the predetermined threshold. In this way, the amplifier may be calibrated such that the sensed current may be accurately compared to the predetermined threshold.

The filter 1210 is configured to reduce noise in the signal summed at the summation circuit 134c. The filtered signal is received by the comparator circuit 138c, which determines if the signal exceeds the predetermined threshold. If so, a high signal is output by the comparator circuit 138c, similar to the way in which the comparator circuit 138a operates in the device 1000. When the total sensed current drops below the predetermined value, the load may no longer be in use, and the comparator circuit 138c outputs a low signal.

The signals output by the comparator circuit 138c are received by the microcontroller 1220 instead of being received at the timer circuit 140a and the controller circuit 150a, as illustrated in FIG. 10. As described above, the microcontroller 1220 may implement functionality of the timer 140 and the controller 150. Thus, sensing of current and comparison of the sensed current to a predetermined threshold may be performed similar in the device 1000 and in the controller 1120, but functions of the timer 140 and the controller 150 may be implemented by the microcontroller 1220. The microcontroller 1220 may be configured to perform the method 810 or the method 820 based on a configuration of the setting selector 195b. Therefore, the microcontroller 1220 may compare an output of a timer function with an output of the comparator circuit 138c.

In the "fixed" timing setting, the microcontroller 1220 outputs a HIGH to the input of the OR gate U11-a when the predetermined amount of time has not expired, or when the sensed current is above the predetermined threshold subsequent to the expiration of the predetermined amount of time. For example, the microcontroller 1220 may output a HIGH during 812 and 814 of the method 810. This will cause the switch 154c to close and a voltage to flow to the triac driver 1130 to instruct the triac driver to cause the triac 1140 to maintain the switch 160b in the closed stated.

When the predetermined amount of time has expired and the sensed current is below the predetermined threshold, the microcontroller 1220 may output a LOW. For example, the microcontroller 1220 may output a LOW after 816 of the method 810. This will cause the switch 154c to open and remove the voltage from the triac driver 1130, thereby instructing the triac driver to cause the triac 1140 to open the switch 160b.

In the "reset" timing setting, the microcontroller 1220 outputs a HIGH to the input of the OR gate U11-a when the sensed current is above the predetermined threshold, or prior to the expiration of the predetermined amount of time after the sensed current drops below the predetermined threshold. For example, the microcontroller 1220 may output a HIGH during 822, 824, and 826 of the method 820. This will cause the switch 154c to close and a voltage to flow to the triac driver 1130 to instruct the triac driver to cause the triac 1140 to maintain the switch 160b in the closed stated.

When the sensed current is below the predetermined threshold and the predetermined amount of time has expired, the microcontroller 1220 may output a LOW. For example, the microcontroller 1220 may output a LOW after 828 of the method 820. This will cause the switch 154c to open and remove the voltage from the triac driver 1130, thereby instructing the triac driver to cause the triac 1140 to open the switch 160b.

The microcontroller 1220 may be configured to perform the method 900 to selectively drive the switch 160b. For example, a trigger may be received at the microcontroller 1220 at step 902 via an interface 1230 from an input device of the enable unit 170b. Similarly, the microcontroller 1220 may receive a trigger via the wireless interface 1128, for example from a wireless interface card coupled to the wireless interface 1128 in response to a user inputting instructions at a remote enable unit. In some embodiments, the controller 1120 further comprises a power supply 1240.

In some embodiments, one or more of the summation circuit 134c, the filter 1210, and the comparator circuit 138c are omitted from the controller 1120. In some embodiments, one or more elements of the current sensors 132 are also omitted from the controller 1120. In such embodiments, the functions of these circuits and/or elements may be implemented by the microcontroller 1220.

For example, the outputs of the current sensors 132b may be coupled to the microcontroller 1220. The waveform of the sensed current may be analyzed by the microcontroller 1220, and the signal may be sampled or converted to a digital representation by the microcontroller 1220 such that a running RMS of the signal may be calculated. The running RMS may be compared to the predetermined threshold, or a running RMS of several phases may be added together for comparison with the predetermined threshold. Calculating the RMS essential rectifies the values of the signal because the values are squared during the calculation. Further, the microcontroller 1220 may filter the signal to reduce noise in the signal. In this way, one or more hardware elements that are currently illustrated in the current sensors 132c, the summation circuit 134c, the filter 1210, and the comparator circuit 138c may be omitted, and the functionality of the omitted elements implemented by the microcontroller 1220.

In some embodiments, the microcontroller 1220 outputs information to the display 1160 and/or to a computer or central monitoring station. The display 1160 and the computer may be coupled together, or may be separated. The microcontroller 1220 may transmit information substantially in real-time regarding the status of the microcontroller 1220, the controller 1120, and/or the system 1100. In some embodiments, a user of the display 1160 may view this data in order to monitor the system 1100 or aspects thereof. For example, the user may view the energy current being consumed by a machine coupled to the system 1100. In some embodiments, the computer may collect and process this data.

The microcontroller may output data indicating a total time that the switch 160b has been closed, times at which the switch 160b has been toggled, times when a load or a no-load condition was detected, or an amount of electricity that has been saved by opening the switch 160b. In some embodiments, an alert may be generated by the microprocessor 1220 or by a computer receiving data from the microprocessor 1220 based on an operating condition of the system 1100. In some embodiments, the alert is visually displayed on the display 1160 and/or an auditory cue is activated.

In some embodiments, instructions may be received from a remote location, such as from a computer wired to or in wireless communication with a network interface of the system 1100, which was discussed above. In some embodiments, the predetermined amount of time may be remotely configured by the computer and/or the system 1100 may be triggered or enabled by the computer.

In some embodiments, a plurality of machines are connected to the outputs 1112, 1114, and 1116 of the system 1100 In some embodiments, a plurality of systems 1100 are implemented, and one or more machines may be coupled to each of the systems 1100. In some embodiments, the microcontrollers of each system may communicate with each other, for example using the network interface discussed above. In some embodiments, the systems each communicate with a central monitoring station. The central monitoring station may coordinate the operation of the machines attached to the systems. For example, the central monitoring station may ensure that the machines are sequentially started instead of being starting substantially concurrently.

The microcontroller 1220 is not limited to performing the operations or calculations described above, and may output different or additional data or information, for example for display on the display 1160 or for processing on a remote computer. Those of skill in the art will appreciate further data, metrics, or information that the microcontroller 1220 may determine or transmit, and will appreciate further functions, operations, or calculations that the microcontroller 1220 may be configured to perform.

Figure 13:
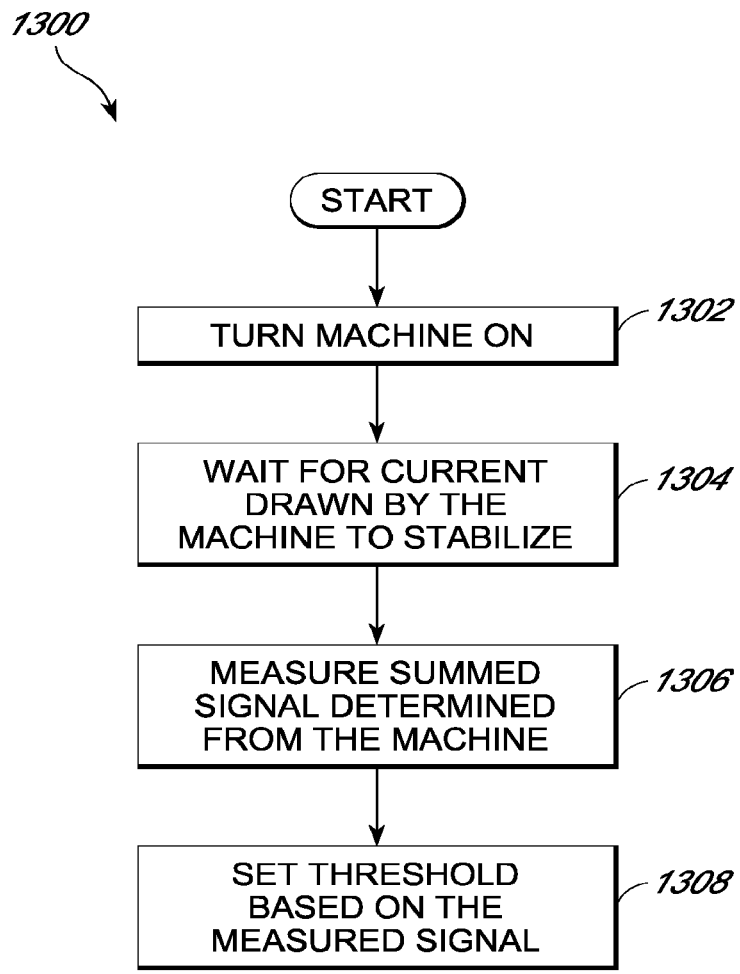
FIG. 13 is a flowchart illustrating a process for use in setting a threshold of the system of FIG. 1A or FIG. 1B.

FIG. 13 illustrates an embodiment of a method 1300 for use in the system 1100 to determine a threshold. Although the method below will be described with respect to elements of the system 1300, those of skill in the art will appreciate that other components may be used to implement one or more of the steps described herein.

At 1302, a machine coupled to the outputs 1112, 1114, 1116 is turned on. After waiting for the current drawn by the machine to stabilize at 1304, a summed signal determined from the machine is measured at 1306 when the machine is turned off or is set to a standby state. For example, the signal may be measured at terminal TP5 illustrated in FIG. 12. In some embodiments, step 1304 may be omitted. It is often advantageous to impose a waiting period, however, because the machine might draw more current when it is first turned on. For example, initializing a computer, loading a program, or performing self tests may all consume more current than the machine would typically consume. In some embodiments, the signal measured at 1306 may be used to determine when the current has stabilized. In other embodiments, the waiting period may be determined by reference to a manual for the machine that describes a warm-up time or warm-up conditions for the machine.

At 1306, the current and/or a voltage may be measured. For example, the current may be measured using a multimeter or other measurement device. In some embodiments, the measurement step may be omitted, and the current drawn by the machine when in a standby state may be determined based on specifications of the machine. Measuring the current, however, is advantageous because it allows for finer adjustment of the predetermined threshold, and accounts for differences in individual machines and operating environments.

In one embodiment, a voltage of the summed signal is measured at 1306. For example, a multimeter may be used to monitor the voltage at the terminal TP5.

At step 1308, the predetermined threshold is set based on the measurement at 1306. For example, the predetermined threshold may be set such that it is above the observed current when the machine is in the standby state, but below a current observed when the machine is actively operating. In one embodiment, a first value is added to the standby current or is subtracted from the operational current to determine the predetermined threshold. In some embodiments, the predetermined threshold is directly proportional to the standby current and/or the operational current.

In one embodiment, a potentiometer R21 in the summation circuit 134c is adjusted with respect to a reference voltage used in the comparator circuit 138c. For example, when in the "reset" timing setting, the potentiometer R21 may be adjusted until a voltage measured at the terminal TP5 is higher than the reference voltage when the machine is idle. In the "fixed" timing setting, the potentiometer R21 may be adjusted until a voltage measured at the terminal TP5 is lower than the reference voltage when the machine is idle.

In some embodiments, the predetermined threshold may be automatically determined. For example, when the microcontroller 1220 is configured to calculate a running RMS of one or more phases, the microcontroller 1220 or another device may monitor the current to determine a normal operating current. The predetermined threshold may be set based on the normal operating current, for example as discussed above. The predetermined threshold may be determined only once or intermittently, for example in a setup or initialization phase. In other embodiments, the predetermined threshold is determined at regular intervals, for example every time the system 1100 is enabled.

In some embodiments, steps similar to those described with respect to the method 1300 may also be used to set one or more of the predetermined delay, first delay, or second delay discussed above with respect to FIGS. 8A and 9.

After the machine is turned on and the current has stabilized, a summed signal may be measured as the machine is transitioning between an operational state and an idle state. For example, the current may be monitored with a multimeter or an oscilloscope. Based on the measurements, it may be determined how long it takes the measured signal to be substantially free from transients or noise, for example free from the measured signal oscillating above and below the predetermined threshold for current determined according to the method 1300. The predetermined delay, first delay, and/or second delay may be set based on this determination. In other embodiments, an RC constant in the controller 1120, for example at the comparator 138c, may be used to calculate one or more of these delays. In some embodiments, one or more of the delays is automatically determined, for example by the microcontroller 1220.

Those of skill in the art will appreciate that the systems, devices, and methods described above may be used to automatically open a switch when a machine in electrical communication with the switch stops drawing a current above a predetermined threshold. In this way, phantom currents drawn by the machine or a transformer coupled thereto may be reduced. The disconnection may be performed independent of the type of machine or load imposed by the machine. Thus, the switch may be properly opened even when little is known about the machine or circuit to which it will be connected.

Those of skill in the art will appreciate that the systems, devices, and methods described above may be used to detect when a load is no longer present. This detection may be passively performed, without injecting a signal or voltage into an attached machine. In some embodiments, a predetermined threshold used to detect the absence of the load may be adjusted by a technician at installation. Thus, the systems, devices, and methods described above may be used with any number or variety of different machines or load types.

Although described separately, it is to be appreciated that functional blocks described with respect to the systems 100, 102, and 1100 need not be separate structural elements. For example, the timer 140 and the controller 150 may be implemented in a microprocessor, as described above. Similarly, one or more of the functional blocks or portions of the functionality of various blocks may be embodied in a single device or mechanism. Alternatively, the functionality of a particular block may be implemented on two or more devices or mechanisms. In addition, additional modules or functionality may be implemented in the systems 100, 102, and 1100. Similarly, fewer modules or functionalities may be implemented. Additional or fewer couplings between the various modules, units, and circuits illustrated in FIGS. 1-7 and 10-12 may be implemented.

The values or parameters of one or more of the various modules, units, and circuits may be set or determined pursuant to an intended use, or pursuant to a voltage received from the power source. For example, different types of switch may be used in the system 100 depending on the voltage that is being provided from the power source to the machine 120.

Those of skill in the art will appreciate that additional embodiments of the various components and elements described herein may be realized. In the embodiment of the device 1000 and the controller 1200 illustrated herein, certain components of the device 1000 and the controller 1200 are illustrated as being interconnected hardware elements. In other embodiments, certain functionality of the device 1000 or the controller 1200 may be implemented in a microchip or microprocessor running appropriate program code. Certain embodiments including such configuration were described above. As shown in FIGS. 10 and 12, however, the elements may be implemented as separate electrical and/or mechanical elements that are wired together, for example using a circuit board or other connection means. Thus, the device 1000 and the controller 1200 and other embodiments disclosed herein may be implemented using means other than a processor or microcontroller or program code, for example with appropriately configured hardware elements arranged to provide the functionality described herein. In some embodiments, functionality of the elements illustrated herein is consolidated in a processor.

Processors, microcontrollers, and microprocessors are all described above. Each of these may be implemented with one or more processors, microcontrollers, or microprocessors. Further, each may be implemented with any combination of general-purpose microprocessors, microcontrollers, digital signal processors (DSPs), field programmable gate arrays (FPGAs), programmable logic devices (PLDs), controllers, state machines, or any other suitable component that can perform calculations or otherwise manipulate information.

The processors, microcontrollers, and microprocessors may also include machine-readable media for storing instructions. The instructions may be stored as software, firmware, middleware, microcode, hardware description language, or in another format. The instructions may include code (e.g., in source code format, binary code format, executable code format, or in any other suitable format of code). The instructions, when executed by one or more of the processors, microcontrollers, and microprocessors may cause the respective processor, microcontroller, or microprocessors to perform various functions described herein.

In the description above, the words or phrases "greater than," "above," "less than," and "below" are used. Those of skill in the art will understand that all such comparative terminology includes equivalence. Thus, "greater than" may include "greater than or equal to," or "at least as great as." Similarly, "above" may include "equal to or above." Likewise, "less than" may include "less than or equal to," or "at most as great as." "Below" may include "equal to or below."

The methods disclosed herein comprise one or more steps or actions for achieving the described methods. The steps and/or actions may be interchanged with one another without departing from the scope of the claims. Unless a specific order of steps or actions is specified, the order and/or use of specific steps and/or actions may be modified without departing from the scope of the claims.

Of course, it is to be understood that not necessarily all objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. In addition to the variations described herein, other known equivalents for each feature can be mixed and matched by one of ordinary skill in this art to construct systems, devices, methods, and techniques for reducing a phantom current or phantom load in accordance with principles.

Although this certain embodiments and examples have been described above, it will be understood by those skilled in the art that the disclosure herein extends beyond the specifically described embodiments to other alternative embodiments and/or uses and obvious modifications and equivalents thereof.

What is claimed is:

1. A system for reducing phantom load in a device, wherein the device receives three or more phases of alternating current from a first electrical power source, the system comprising:
   outputs configured to provide electric power obtained at least in part from the three or more phases of alternating current;
   a contactor configured for electrical connection to each phase of the alternating current and for electrical connection to inputs of the device, wherein the contactor is configured to selectively connect each of the phases to a respective input of the device, wherein the outputs are in electrical communication with the contactor;
   a current detector configured for electrical communication with the outputs, the current detector comprising
      a plurality of current sensors, at least one of the plurality of current sensors being associated with each of the phases provided by the outputs,
      a summer configured to sum the current sensed in each of the current sensors,
      a comparator configured to compare the summed current to a predetermined value, the comparator being configured to generate a first signal when the summed current is less than the predetermined value;

a timer in communication with the comparator and configured to indicate that a predetermined amount of time has elapsed; and a controller configured to receive the first signal from the comparator and the indication from the timer, and configured to cause the contactor to disconnect each phase of alternating current of the power source from the inputs of the device based on at least the first signal and the indication.

2. The system of claim 1, wherein the controller is configured to disconnect each phase of alternating current when the summed current is below the predetermined value for a period of time greater than or equal to the predetermined amount of time.

3. The system of claim 1, wherein the comparator is configured to generate a second signal when the summed current is greater than or equal to the predetermined value.

4. The system of claim 1, further comprising an enable unit in communication with an input device, wherein the enable unit is configured to notify the controller of a user input on the input device, and wherein the controller is configured to cause the contactor to connect each phase of alternating current of the power source to the inputs of the device in response to being notified.

5. The system of claim 4, wherein the controller is configured to disconnect each phase of alternating current when the predetermined amount of time has elapsed since the enable unit notified the controller and the summed current is below the predetermined value for a period.

6. The system of claim 4, wherein the enable unit comprises a transmitter configured to wirelessly notify the controller of the user input.

7. The system of claim 4, wherein the controller is configured to wait for at least a first delay after the contactor has been opened before connecting each phase of alternating power.

8. The system of claim 1, comprising a power supply configured for electrical connection to a second electrical power source, wherein
the power supply is configured to supply one or more of a plurality of direct current voltages to the current detector, the timer, and the controller.

9. The system of claim 1, wherein the timer is configured to allow selection of the predetermined amount of time.

10. The system of claim 1, further comprising a mechanism configured to drive the contactor in response to commands from the controller, and further configured to galvanically isolate the controller from the power source.

11. The system of claim 10, wherein the contactor is a normally-open contactor, and wherein the mechanism is configured to apply a current to the contactor sufficient to keep the contactor closed when the summed current is at least as great as the predetermined value.

12. The system of claim 1, wherein one or more of the current sensors comprises a sensing coil encircling a conductor carrying the phase that the sensor is associated with.

13. The system of claim 1, further comprising a selector configured to change when the timer begins counting down the predetermined amount of time.

14. The system of claim 1, wherein the device comprises an industrial machine, and wherein an input of the industrial machine is coupled to one of the outputs.

15. The system of claim 1, wherein the device comprises a transformer, wherein a primary winding of the transformer is coupled to the contactor, and wherein a secondary winding of the transformer is coupled one of the outputs.

16. An apparatus for automatically disconnecting a device from a power source, the power source providing two or more phases of current, the device comprising:
two or more outputs, each of the outputs corresponding to a respective phase of the two or more phases of current;
a switch electrically configured for electrical connection to the power source and to inputs of the device, wherein the switch is configured to selectively connect the two or more phases of current to the inputs of the device;
at least two current sensors configured to sense current flowing to the outputs;
a comparator configured to detect when the total current sensed in the at least two current sensors is below a threshold;
a determination unit in communication with the switch and configured to determine, based at least on the detection of the comparator, when to disconnect the two or more phases of current from the inputs of the device; and
a timer in communication solely with the determination unit, wherein the determination unit determines to disconnect the two or more phases of current from the transformer when the current sensed in the at least two current sensors is below the threshold and the timer indicates that a selected time has expired.

17. The apparatus of claim 16, wherein the comparator is configured to detect when the combined current is below the threshold.

18. The apparatus of claim 16, wherein the selected time begins when the switch is placed into a closed configuration.

* * * * *